United States Patent

Battle

[11] Patent Number: 6,081,592
[45] Date of Patent: Jun. 27, 2000

[54] AUTOMATIC CALL-WORK DIRECTOR

[76] Inventor: Calvin W. Battle, 1498 Oakridge Cir., Decatur, Ga. 30033

[21] Appl. No.: 08/906,235

[22] Filed: Aug. 4, 1997

Related U.S. Application Data

[60] Provisional application No. 60/023,461, Aug. 6, 1996.

[51] Int. Cl.[7] .............................. H04M 5/06; H04M 1/64; H04M 3/50; H04Q 3/64
[52] U.S. Cl. .......................... 379/309; 379/201; 379/265
[58] Field of Search .................................. 379/201, 214, 379/265, 266, 308, 309

[56] References Cited

U.S. PATENT DOCUMENTS

| | | | |
|---|---|---|---|
| 5,179,589 | 1/1993 | Syu ........................................ | 379/265 |
| 5,185,780 | 2/1993 | Leggett ................................ | 379/265 X |
| 5,206,903 | 4/1993 | Kohler et al. ........................... | 379/309 |
| 5,299,260 | 3/1994 | Shaio .................................... | 379/265 |
| 5,327,490 | 7/1994 | Cave .................................... | 379/266 X |
| 5,329,578 | 7/1994 | Brennan et al. ....................... | 379/88.19 |
| 5,335,269 | 8/1994 | Steinlicht .............................. | 379/266 |
| 5,392,346 | 2/1995 | Hassler et al. .......................... | 379/265 |
| 5,467,391 | 11/1995 | Donaghue, Jr. et al. ............... | 379/265 |
| 5,499,291 | 3/1996 | Kepley .................................. | 379/265 |
| 5,506,898 | 4/1996 | Costantini et al. ..................... | 379/266 |
| 5,509,055 | 4/1996 | Ehrlich et al. ....................... | 379/309 X |
| 5,590,188 | 12/1996 | Crockett .............................. | 379/265 X |
| 5,592,543 | 1/1997 | Smith et al. ........................... | 379/265 |
| 5,640,445 | 6/1997 | David .................................. | 379/265 X |
| 5,642,411 | 6/1997 | Theis .................................... | 379/266 |
| 5,684,872 | 11/1997 | Flockhart et al. ..................... | 379/266 |
| 5,721,770 | 2/1998 | Kohler .................................. | 379/266 |
| 5,740,238 | 4/1998 | Flockhart et al. .................. | 379/265 X |
| 5,754,639 | 5/1998 | Flockhart et al. .................. | 379/265 X |
| 5,781,624 | 7/1998 | Mitra et al. ......................... | 379/265 X |
| 5,784,452 | 7/1998 | Carney ................................ | 379/265 |
| 5,815,566 | 9/1998 | Ramot et al. .......................... | 379/265 |
| 5,822,400 | 10/1998 | Smith .................................. | 379/265 X |
| 5,825,869 | 10/1998 | Brooks et al. ........................ | 379/265 |
| 5,828,747 | 10/1998 | Fisher et al. ........................... | 379/309 |
| 5,907,601 | 5/1999 | Smith et al. ....................... | 379/265 X |
| 5,926,528 | 7/1999 | David ................................ | 379/265 X |

*Primary Examiner*—Harry S. Hong
*Attorney, Agent, or Firm*—Needle & Rosenberg, P.C.

[57] ABSTRACT

The capability of communications systems is improved in completing call requests. Using automatic methods, people with appropriate communications devices are made available to receive calls under terms that protect the people's availability to do other work. An increase in the level of calls may be accommodated by automatically augmenting forces presently engaged in handling calls with a person from an adjunct work group who is normally engaged in tasks other than handling calls. When sufficient numbers of people in adjunct groups are available, no dedicated call-handling force is required. The regular work of people in these adjunct groups is interrupted to begin a period of handling calls under predetermined terms and conditions. Calls are then received until other terms and conditions for ending the period are satisfied. A preferential right to receive calls after the first call during the period of receiving calls may be specified. A priority feature is provided: calls determined to have a higher priority are afforded a higher probability of connecting immediately to a person. In selecting from among eligible groups or persons to interrupt, an algorithm provides relative measurements of the call-handling benefit provided from the interruption.

13 Claims, 11 Drawing Sheets

**Call Connection Path to Call
Station on User's Premise**

INTERRUPTED CLUSTER LISTS

FIRST RIGHTS

501

LIST OF AVAILABLE FIRST RIGHTS CLUSTERS

504

RESUFFLED FIRST RIGHTS CLUSTERS

506

DEDICATED CLUSTERS

502

LIST OF AVAILABLE ROTATING RIGHTS CLUSTERS

505

RESUFFLED ROTATING RIGHTS CLUSTERS

507

ROTATING RIGHTS

503

AUTOMATIC CALL-WORK DIRECTOR

CROSS-REFERENCE TO RELATED APPLICATION

The present application is a continuation-in-part of U.S. Provisional Application Ser. No. 60/023,461, entitled "Automatic Call Station Augmentation System for Incoming Calls", filed Aug. 6, 1996.

TECHNICAL FIELD

This invention is related to communications systems, and particularly to choosing a person with a communications device to whom a call is then coupled and to automatically adjusting forces engaged in receiving calls.

BACKGROUND OF THE INVENTION

Calls directed to a work group or call center may find everyone busy with other calls and thus be delayed or blocked from receiving service from a person. Minimizing such delays and blocked calls is one of the management goals for such organizations. An important parameter is the percentage of callers that arrive when everyone is busy that is standing by to answer the call. Herein this is referred to as the percent blockage. Another important parameter is the proportion of the work-time that is spent actually communicating with callers as opposed to just waiting for incoming calls. This is sometimes referred to as the percent occupancy (or efficiency).

There is a relationship predictable using the work of the Danish telephone engineer A. K. Erlang (1909 paper) between the size of the service group which is needed to prevent too many unserved (blocked) calls and the percentage of time that the group members are occupied with calls. For a given blocking rate small groups serving small call volumes (particularly those with less than 100 servers) are not able to obtain the efficiency rates of larger groups serving large call volumes: The small group is busy with calls a smaller percent of time. For instance, for 6 servers who in their busiest hour are not able to serve two out of every 100 calls, the percent occupancy based on Erlang's "lost call formula" is 41%. For 100 servers also not able to serve two out of every 100 calls the percent occupancy is 88%.

A primary approach to improving efficiency is to aggregate incoming calls and create large service groups to handle them. Though this method does raise the percent occupancy, it has the disadvantage of being applicable only where there are large call volumes which warrant forming the large work group. Also, even when large work groups are formed there may be a sameness about each transaction which becomes excessively monotonous to the people engaged in the work. This is particularly true if the occupancy goals are supplemented with time per transaction goals which lead to an emphasis on specialization: The further specialization being undertaken to improve the time per transaction performance. Besides being applicable just to larger call volumes, major problems related to the monotony of the work may develop including high turnover costs, high training costs, absenteeism, worker health issues, and unenthusiastic work performance. For the large work group these problems all contribute to losing some of the economies of scale that the group may initially have as well as to diminishing the quality of service provided to callers.

New technologies are being used to improve the occupancy time of human attendants. A mechanized response system may be offered as a substitute for the human attendant, effectively sifting through incoming calls. The total calls per attendant is increased by counting as served these calls which are shuffled over to an associated voice-response information system or to voice mail services or to a system that sends back facsimile messages. In another solution callers may be queued up and experience various waiting times so that from the view of the call station attendant there is usually someone on the line after the last call and the time experienced between callers is shortened. These methods have the disadvantage from the callers' view of introducing delays and providing less information or personal attention at a greater cost in time than may be satisfactory to them. When this happens, rather than improving productivity for the transaction as a whole, these devices just transfer service costs from the called service's organization to the calling organization.

Other problems are encountered in administering traditional call-handling groups. The administrative goal is to handle the call well while balancing the competing objectives of minimizing the number of agents, maximizing the calls per agent, and blocking from service a minimized proportion of calls. The administrative method used is to attempt to predict the requirements for call-handling forces and then try to closely schedule the available forces to match that prediction. These predictions, while essential and helpful, may often fail to satisfactorily estimate the actual future number of calls and call minutes presented to the forces or the number of people actually making up the forces. The result may be an inconsistent level of service and less than optimum balancing of the competing objectives.

Technology is enhancing the abilities of people to handle different situations presented over the telephone or over multimedia networks. In particular, databases of information can be tapped to provide, in a split second, information helpful to serving callers. For instance, for known callers the account number, address, and service, order or billing history can be provided to assist in servicing a call. Likewise companies' customer service systems even flash sales prompts for the attendants suggesting additional related items to callers. Also, the experience with other callers can be captured in other databases and utilized to shorten the problem solving process on a call: in particular, the present caller's situation can often be correlated with successful experiences serving past callers and the successful approach can be rapidly duplicated. Recent services launched by consumer-oriented companies use such databases and expertise repositories.

These mechanized aids can reduce the level of experience required to satisfy callers' requests. With them, incoming callers could be served by people with other regular duties thereby introducing variety and manageable content into the job design. However, the ability to mix and diversify a person's work day tasks by adding the answering of received calls is hampered by a lack of automatic means for balancing the call work with the other work demands of the person who would undertake both.

In summary the drawbacks of present methods can include low efficiency for groups handling small incoming call volumes, limited ability to adjust to sudden barrages of calls, missing customers' calls from momentarily having too few call stations eligible, job designs with excessively monotonous tasks, and difficulties with force level planning and scheduling. Also present methods don't support the mixing of work types—regular work and call work—thereby foregoing the more extensive use of new call support technologies and the added variety and extra scope that could enrich jobs and lead to accompanying benefits from lower turnover and more enthusiastic work performances.

SUMMARY OF THE INVENTION

The foregoing problems are solved and greater flexibility is obtained in structuring both regular and call-handling tasks by a novel system for automatically directing call work to a person. Calls received at a call-coupling means which is under the control of a call processing control are directed to people whose identity is determined by the automatic call-work director of the present invention.

Parameters associated with the terms for beginning and ending a period of receiving calls in a call work session are kept in a database. When a call of a particular type arrives to find no one standing by to answer a call of its type then the terms of people that can take the type of call received are evaluated for beginning a period of taking calls. The regular work of one such person will be interrupted and the call routed to that person. Calls of types that it has been predetermined the person may take are serviced until a term for ending the period of taking calls is satisfied. These terms apply to a person; but to allow for a group of people having the same terms they are accessed through a cluster identification. A person may have a unique cluster identification or may share the identification with other persons. Persons with the same cluster identification—and consequently the same terms governing interruptions—will together enter and leave periods of receiving calls and will share other features of the automatic call-work director. When a person has a unique cluster identification there is no difference between selecting a cluster and choosing the person. When there is more than one person in a cluster then once the cluster is selected an extra step is needed, that of choosing a person from those associated with the cluster. The type of the call is best identified by the goal of the caller as indicated by the dialed number or resource location selected and the media (text, text and graphics, voice, video) of the incoming channel.

Kept in the record of each cluster is a call-period indicator telling if a cluster is in a period of receiving calls. In addition in each person's record is a busy-with-call indicator telling if a person is busy with a call. Within these records are also kept operating characteristics such as average call interarrival time (the time between the receipt of one call and the receipt of the next call) and average call holding time (the time that it takes to provide service to the call) that are useful to the Interruption Benefit Algorithm in selecting a cluster.

A Cluster Master Table and a Call Station Master Table are set up initially and for so long as the automatic call-work director is run. The Cluster Master Table contains term parameters, the call-period indicator, a link to the associated call stations in the Call Station Master Table, and other variables. Likewise, an associated Call Station Master Table contains entries for people at call stations, such as the busy-with-call indicator, the identifier for the call being serviced and its beginning time, a link to the Cluster Master Table and other operational variables. In addition there are three interrupted cluster lists which keep the reference to the appropriate interrupted clusters for so long as the cluster is in a period of receiving calls; that is, for so long as it has a call-period indicator of TRUE. It is in these three lists that the automatic call-work director first searches to find a cluster to select. If this search is not successful then the records of uninterrupted clusters within the Cluster Master Table are accessed and clusters with call-period indicators showing FALSE are reviewed. If there are such clusters in a segment of their schedule wherein they have committed to entering a period of taking calls and if their other terms for beginning such a period are satisfied references to these clusters are placed on lists of available clusters. Additional lists will be formed as the selection process proceeds.

Uninterrupted clusters are grouped into a preferred list and a reserve list early in the review process. A selection is first attempted from clusters on the preferred list and after that from clusters on the reserve list. An "order of interruption" number may be predetermined and placed in each cluster's record. However, the automatic call-work director allows the same predetermined interruption order number to be specified for several or all of the clusters. To select from among those with the same specified order of interruption number, the benefit of interrupting each cluster is calculated. A first step in this calculation is to find the maximum time—called the critical time—that the interruption of the cluster can be postponed before an opportunity to interrupt it is lost. This time is obtained by constructing a model of the maximum future interruptions possible consistent with the cluster's terms for beginning and ending a call-period. If no special situations governed by specific rules exist, the cluster with the lowest critical time is selected.

Once a cluster is selected, a member of the cluster is chosen to receive the call and this member is then coupled to the call. A reference to the selected cluster is placed in the appropriate interrupted cluster list and at the same time its call-period indicator is set to TRUE. The busy-with-call indicator of the chosen person is also set to TRUE. This reference to the cluster stays in the appropriate interrupted cluster list until a term for ending the period of receiving calls is satisfied. The cluster is then removed from the appropriate interrupted cluster list and the call-period indicator is returned to a FALSE setting. These ending terms for each cluster in an interrupted cluster list are evaluated early in the directing process for a call before beginning the search of the interrupted cluster lists for an eligible cluster.

While in an interrupted cluster list a cluster may be given rights over other clusters to receive calls for which it is eligible by designating it a "first rights" cluster. With this designation it will be able to fulfill as rapidly as possible a term requiring it to receive a certain number of calls. Once interrupted such a cluster while it has call stations eligible is considered first to receive every call.

One potential interruption-beginning term is the requirement that a prescribed uninterruptible interval goal of time pass after the last call-work session is completed before beginning another one. Associated with this term is a priority system under which the length of the prescribed uninterruptible interval goal may be reduced according to the priority of the call being received. The automatic call-work director implements this priority system by introducing an interval, the priority concession interval, which though usually but a portion of the uninterruptible interval goal may be as long as the whole interval. By reducing the uninterruptible interval goal term for beginning an interruption the priority method increases the resources eligible to serve callers according to their priority, thereby reducing the chances of the calls being blocked from receiving service.

Once a cluster is selected either to be interrupted or for a subsequent call in a call-period then if there is a single person associated with the cluster that person is chosen to receive the call. But if there are multiple persons associated with the cluster then several traditional techniques may be employed to select from among them either exclusively or in combination with a method presented here. This method uses a call order number predetermined for each person which indicates the order in which persons will take calls that are offered to the cluster. The person with the lowest call-order number will be considered first to receive the call. An assigned call order number need not be unique: ties are settled by adding a stage to the process of choosing a person at a call station.

DETAILED DESCRIPTION OF THE INVENTION

1. Definitions

Figure 1:
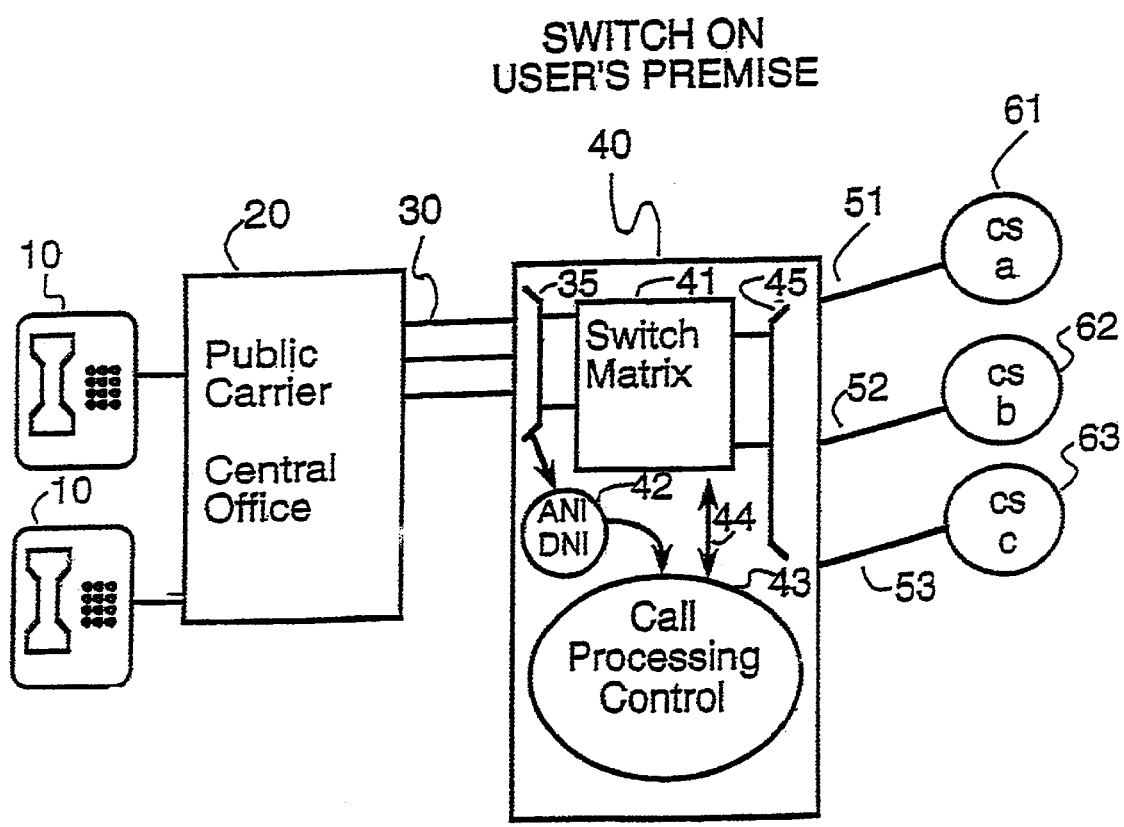
FIG. 1 shows an overview of the traditional operation of a customer premise switching system incorporating the present invention.

The following definitions provide a convenient reference to key words used throughout this specification. These definitions are provided merely to further elaborate on the exemplary embodiments of the present invention described in the specification. They are not designed to limit the scope of the invention. Persons having ordinary skill in the art will recognize that the present invention may be implemented in a variety of ways, and the key words defined below may have varying meanings in the context of the particular implementation:

calls—active communications sessions between people a distance apart using telephones or other media.

call station—an instrument appropriate to the communications media and other equipment used by a person to receive and service calls. Besides supporting the physical communications, such a station may be equipped to receive information about the caller from the network and from a caller database, to enter information from the call, and to support the service being provided with access to databases and other people.

call-period—the period in which the cluster is actively engaged in receiving calls. It begins for a cluster when, the terms for beginning an interruption having been satisfied, one of the cluster's call stations is chosen and the communications path is established. The call-period ends when one or more terms for ending the call-period are satisfied, ending the cluster's eligibility to be assigned further calls.

cluster—a group of call stations which share the same terms for beginning a call-period, for receiving calls during the period, and for ending the period. A cluster's call stations will share a rule for distributing calls among them.

call-work session—the call-work session begins for a cluster when, a session not already being in progress, a new call-period begins. The call-work session ends when the last active call received in one of its call-periods is completed.

uninterruptible interval goal parameter—an interval of time during which the cluster may not be interrupted to start a call-period. It extends from the end of the last call-work session of the cluster.

commitment segment—a segment of time during the work day when the persons in a cluster commit to initiate and pursue a call-work session if other terms for beginning a call-work session are satisfied and if chosen to receive an initial call. Passing the end of the commitment segment is a sufficient condition for ending a current period of receiving calls.

critical time—calculated for clusters that have satisfied their terms for being interrupted, it is equal to the maximum time that starting a call-period can be postponed. More completely it is the maximum interval in a model sequence of the maximum number of call-periods in a commitment segment after which access to the resources of the cluster for the next whole call-period will be lost.

database—one or a combination of data structures including arrays, linked lists, vectors or commercial database products used to store the tables, lists, and variables of the present invention.

interruption counting period (ICP)—an interval of time wherein the number of interruptions to begin call-periods is limited to a specified maximum number. For counting purposes the beginning of a call-period is also the start of an interruption.

beginning terms—conditions to be satisfied prior to beginning a new period of receiving calls.

ending terms—conditions one or more of which when satisfied are sufficient to end the current period of receiving calls in a call-work session.

first rights—provides an eligible cluster already interrupted that currently has at least one call stations not busy with a call with the first right to be assigned the received call. Should more than one "first rights" interrupted cluster have available call stations, the one which first began its call-period will be selected.

rotating rights—for interrupted clusters provides a right to a received call according to the time since the completion of the last call where the longer such time confers a superior right. The interrupted cluster with the person to be assigned a call with the longest time since the completion of the persons last call will be first in line to be selected. Clusters with this classification are considered after any clusters with a first rights classification.

schedule—specifies beginning and ending times of commitment segments for each cluster.

slack or slack time—the amount of time in a model sequence of the maximum number of call-periods in a commitment segment until the beginning of the first call-period in an ICP. Measured from the start of the ICP.

slack point—the time when the first call-period in an ICP begins in a model sequence of the maximum number of call-periods in a commitment segment.

anchor point—the point in an interruption counting period in a model sequence of the maximum number of call-periods denoting the start of the last call-period which both begins within the interruption counting period and begins prior to the end of the present commitment segment.

2. Description of the Invention

FIG. 1 provides a first example of the general operation of the present invention with switching hardware, often called a private branch exchange (PBX), when used in connecting incoming calls of a type to be directed by the automatic call-work director (described in further detal later) to people at call stations. In this example the present invention may be loaded into memory with the call processing control 43 or be linked to it. It serves to extend the capabilities of the PBX for the selected types of calls. Callers on telephones 10 access the customers premises over the public switched network 20 and eventually over trunks 30 to the trunk ports 35 and on into switch 40. In many cases the telephone number of the caller (provided either by "automatic number identification" —ANI—or calling number identification service) will be provided 42. When this is available and a means of querying a caller database is provided a priority index may be used within the call-work director to make more resources available to high priority callers. Dialed number Identification (DNI) 42 will be provided and serve to define the call type to the call processing control 43. The call type will be provided to the automatic call-work director when more than one type call is to be directed by it, and the cluster records used by the automatic call-work director will then contain the predetermined types of calls that each cluster may receive.

When a call is received of a type to be routed by the automatic call-work director then the call processing control will provide the automatic call-work director with a call identifier, the type call and perhaps a priority index. The identity of a call station will then be produced by the automatic call-work director and used by the call processing control to couple the call to the person at the call station. Through a local bus or data network 44 the call processing control 43 provides instructions that direct the setting up of the call in the switch matrix 41 from the trunk appearance 35 of the incoming call to the line appearance 45 of the chosen call station on one of the lines 51, 52, or 53 which serve the call stations a, b, or c 61, 62, 63. The destination call station is alerted (by for instance ringing the phone) and the coupling to the call station is established when the call station goes "off-hook", typically when the person at the call station picks up the phone. Notice of the establishment of the connection is provided to the automatic call-work director.

The placement of the equipment functionality shown in FIG. 1 back at the Public Carrier Central Office would still represent a suitable platform for the deployment of the present invention. In this latter case, the lines 51 would extend to the Central Office 20 and call processing control for the central office would communicate with the automatic call-work director of the present invention. Also the placement of the present invention in a separate memory accessible by the call processing control would not materially change the functioning of the invention.

EXAMPLE

Imagine, for illustrative purposes, a business called "SW Direct" that distributes packaged software out of a central location. It takes most of its sales orders by mail, FAX, and E-mail from existing customers. But it also has special purpose 1-800 and local numbers for sales and it takes sales orders received on these numbers. SW Direct has a group dedicated just to answering these special purpose incoming calls. It has also cross-trained people in four other groups. Resources trained in receiving calls are as shown in Table 1:

TABLE 1

Resources trained on incoming sales-calls

| Number of People | Group | Cluster ID |
|---|---|---|
| 10 | Dedicated Incoming Call Unit | K101–K109 |
| 19 | Incoming Mail Group | K1–K19 |
| 5 | Catalog Group | K51 |
| 5 | Purchasing | K42 |
| 3 | Shipping & Receiving Documents Group | K34 |

The people in all except the first group have regular tasks not involving receiving the incoming calls. But the groups are staffed so that a portion of their time is available and they have been equipped with access to the order entry system so that they can fill the requests of incoming callers.

The present invention allows terms to be set so that each of these groups can meet the requirements of its regular duties and still help out with incoming calls. Table 2 below shows the company's first configuration utilizing the automatic call-work director of the present invention. In this configuration there are ten dedicated one-position call-handling clusters K101 to K109 designated "Dedicated" in column B, having no duties but answering calls. These dedicated clusters are backed up by nineteen call stations in the mail group, Table 2, rows 3 and 4, which are also arranged into one-position clusters and identified from K1 to K19. In column B they are designated "Preferred" for backing up the dedicated call stations.

The terms that must be satisfied prior to interrupting these back-up clusters include completing an uninterruptible interval goal of 80 minutes between call-work sessions as shown in column C. However, the 80 minute interval could be reduced by as much as six minutes (the "priority concession interval" number in parenthesis, column C) if a call with a high enough priority were to initiate the interruption. So 74 minutes is the very minimum uninterruptible interval. For these clusters no more than four interruptions (see column D) for call-work sessions are allowed in a 9 hour period which is the single interruptions counting period (ICP) for the clusters.

TABLE 2

SW Direct - Beginning terms for the clusters' call-periods

| | | col | | |
|---|---|---|---|---|
| row | A Cluster ID: number of call stations (Cs) each cluster | B Category | C Uninterruptible interval in minutes | D Interruptions per period | E Schedule of commitment segments |
| 1 | K101–105: 1 Cs | "Dedicated: Call-handling Duties Only" | no limit | no limit | 8:30–12:45, 13:30–5:00 |
| 2 | K106–110: 1 Cs | | no limit | no limit | 8–12:15, 13:00–4:30 |
| 3 | K1 to K8: 1 Cs ea. | "Preferred" | 80 (6)* | 4/9 hours | 8AM-12:00, 12:45–4:30, |
| 4 | K9 to K19: 1 Cs ea. | | 80 (6) | 4/9 hours | 8:30–12:30, 13:15–5:00 |

*Notes:
(1) The number in parenthesis is the reduction permitted in that interval for the highest priority caller.

According to the ending terms, the call-period for the preferred clusters in this case is limited to 20 minutes (not shown in this Table, but shown in Table 4) unless the end of one of the commitment segment listed in column E is reached first in which case the call-period ends immediately. Although the end of a commitment segment ends a call-period (and eligibility to receive calls) an active call is not cut off.

Expanding the example, suppose now that on peak days with a daily load slightly less than 1000 calls and a morning busy hour almost as large in call volume as the afternoon's busiest hour, the company finds that too many customers are not finding people available to serve them. It negotiates terms with the other cross-trained groups—K51, K42, and K34—to bring all of them on line. Table 3, rows 5, 6, and 7 show the new resources and their terms for beginning call-periods familiar from the discussion of Table 2.

TABLE 3

Beginning terms for SW Direct reserve and preferred clusters' call periods

| | | col | | |
|---|---|---|---|---|
| row | A Cluster ID & number of Call stations (Cs) each Cluster | B Category | C Uninterruptible interval in minutes | D Interruptions per period | E Schedule ## of commitment segments |
| 1 | K101–105 1 Cs | "Primary: Call-handling Duties Only" | no limit | no limit | 8:30–12:45, 13:30–5:00 |
| 2 | K106–110 1 Cs | | no limit | no limit | 8–12:15, 13:00–4:30 |
| 3 | K1 to K8 1 Cs ea. | "Preferred" | 80 (6)** | 4/9 hours | 8–12:00, 12:45–4:30, |
| 4 | K9 to K19 1 Cs ea. | | 80 (6) | 4/9 hours | 8:30–12:30, 13:15–5:00 |
| 5 | K51 5 Cs | "Reserve" | 25 (8)** | 5/9 hrs | 8–12:00 13:00–17:00 |
| 6 | K42 5 Cs | | 45 (8) | 5/9 hrs | 8–12:00 13:00–17:00 |
| 7 | K34 3 Cs | | 45 (8) | 5/9 hrs | 8:15–11:45 12:30–17:00 |

*Notes:
(**) The number in parenthesis is the reduction permitted in that interval for the highest priority caller.

Because the last clusters listed (rows 5, 6, and 7) should not be interrupted except for the heaviest calling levels, all are protected by being designated "Reserve". They will only be interrupted when there are no dedicated and preferred clusters to be interrupted.

In Table 4, consistent with the demands of the regular work of these groups, SW Direct specifies other terms. Columns B and C contain the terms for ending the interruptions: Column C is the number of calls the cluster agrees to handle during an interruption, and column B contains the maximum call-period duration interval which provides assurance that no matter how few calls are offered the call-period will end after the number of minutes shown. When there is no goal for the number of calls (Table 4, Rows 3 and 4 ) either reaching the end of the call-period duration interval or the end of the commitment segment itself will end the call-period. The requirement that the entire length of call-periods occur within commitment segments (Table 4, column E) makes being within one a necessary condition for beginning an interruption and passing out of one a sufficient condition for ending the call-period.

Table 4, column D, contains parameters of the term governing the right to receive calls during the interruption. Two such rights are provided: "first rights", provide the first chance to serve every call when a cluster so designated has an eligible call station, and "rotating rights", which provide a rotating right to serve the call according to the time since the cluster's chosen call station's last served call. Reserve cluster—K51, K42, and K34—have first rights so when one of these clusters is already in a period of receiving calls it will get first choice for the assignment for every incoming call until the quota of calls for its call-period is reached. (Were two first rights clusters active at the same time the one interrupted first would have the higher rights to receive all of the calls it could until one or more of its terms were satisfied.) The first rights designation helps guarantee a cluster the minimum period of handling calls, so it can return as soon as possible to its regular work.

SW Direct also specifies an interruption order (Table 4, column E) for all the clusters so that some groups—in Table 4 this is cluster K51—even within their preferred or reserve category will be considered last to be interrupted.

Finally, SW Direct specifies how call stations will be accessed. Those with a single call stations are marked "single" in column F and choosing the call station follows immediately from choosing the cluster. But in those clusters which have multiple call stations a choice of methods is provided. A technique presented here is used by Cluster K51: the call order number method of assigning call stations. In it a number designates the order in which call stations are considered to receive calls offered to the cluster.

TABLE 4

SW Direct ending and call rights terms for reserve and preferred clusters

| | | | col | | | |
|---|---|---|---|---|---|---|
| row | A<br>Cluster ID:<br>number of<br>call stations (Cs)<br>each cluster | B<br>call-<br>period<br>Dur-<br>ation | C<br>Calls<br>Assgd<br>per<br>call-prd. | D<br>Rights<br>to Calls<br>Type | D<br>ION** | F<br>call<br>station<br>Selec-<br>tion<br>Method |
| 1 | C101–105: 1 Cs | no lmt. | no lmt. | Rotate | 1.0 | Single |
| 2 | C106–109: 1 Cs | no lmt. | no lmt. | Rotate | 1.0 | Single |
| 3 | C1 to C8: 1 Cs ea. | 20 min | no lmt. | Rotate | 1.0 | Single |
| 4 | C9 to C16: 1 Cs ea. | 20 min | no lmt. | Rotate | 1.0 | Single |
| 5 | K51: 5 Cs | 15 | 9 calls | F.Rts* | 2.0 | Call Order |
| 6 | K42: 5 Cs | 15 | 9 calls | F.Rts | 1.0 | LastCallCm |
| 7 | K34: 3 Cs | 15 | 9 calls | F.Rts | 1.0 | plt<br>Random |

*F.Rts = first rights
**Interruption Order Number

As a final example, suppose the members of the dedicated group are reassigned and the group disbanded: the ten employees in the dedicated group are trained on other duties and the company reassigns nine of them to the mail group and one to the catalog group K51. Also, suppose SW Direct is focusing on graphics software for illustrators and has set up a new telephone line that it is publicizing in targeted advertising to this segment of the market. As shown in Table 6 column E some groups are not yet qualified to take this type call to the graphics software sales lines.

After some trial and error, SW Direct manages to balance the regular tasks and call-work. It will now not have any group dedicated just to answering calls. The terms of the clusters representing all four groups are different as shown in Tables 5 and 6. All persons in the mail group, new and old, will be subject to 8 rather than 4 interruptions and have a shorter minimum uninterruptible interval between call-work sessions. (30 minutes versus 80 minutes). A new limit on the number of calls of six will sometimes result in shorter call-periods than that provided by the maximum call-period duration goal, which is increased to 25 minutes. The catalog group, cluster K51, with its extra person will have its uninterruptible interval goal reduced to zero minutes. It will have the number of calls in each interruption increased from nine to 10. Though it may be interrupted at any time six times during the scheduled commitment segments, the maximum time for receiving all 10 calls in the call-period remains at 15 minutes. This cluster's interruption order number, column F in Table 6, being higher than any other reserve cluster makes it the "cluster of last resort" to be interrupted. The terms for the other clusters not receiving extra people—K42 and K34—remain unchanged as do all clusters' schedules of commitment segments.

TABLE 5

Beginning terms to eliminate SW Directs dedicated clusters

| | | | col | | |
|---|---|---|---|---|---|
| row | A<br>Cluster ID:<br>number of<br>call stations (Cs)<br>each cluster | B<br>Category | C<br>Uninter-<br>rupted<br>Interval<br>in<br>minutes | D<br>Interrup-<br>tions per<br>period | E<br>Schedule<br>of<br>commitment<br>segments |
| 1 | K101 to 5: 1 Cs | "Pre ferred" | 35 (6) | 8/9 hours | 8:30–12:45,<br>13:30–5:00 |
| 2 | K106 to 9: 1 Cs | | 35 (6) | 8/9 | 8–12:15,<br>13:00–4:30 |
| 3 | K1 to K8: 1 Cs | | 35 (6) | hours | 8–12:00,<br>12:45–4:30, |
| 4 | K9 to K19: 1 Cs | | 35 (6) | 8/9 hours<br>8/9 hours | 8:30–12:30,<br>13:15–5:00 |
| 5 | K51: 6 Cs | "Reserve" | 0 (0) | 6/9 hrs | 9–12:00<br>13:00–17:00 |
| 6 | K42: 5 Cs | | 45 (8) | 5/9 hrs | 8–12:00<br>13:00–17:00 |
| 7 | K34: 3 Cs | | 45 (8) | 5/9 hrs | 8:15–11:45<br>12:30–17:00 |

TABLE 6

SW Direct - Other terms to eliminate clusters dedicated just to answering incoming calls

| | | | | col | | | |
|---|---|---|---|---|---|---|---|
| row | A<br>cluster ID:<br>number of<br>call stations (Cs)<br>each cluster | B<br>Call-<br>period<br>Max<br>Duration | C<br>Calls<br>Assgd<br>per<br>call-prd. | D<br>Rights<br>to Calls | E<br>Call<br>Type<br>Handled | F<br>ION** | G<br>call<br>station<br>Selection<br>Method |
| 1 | K101 to 5: 1 Cs | 25 min | 6 | Rotate | All | 1.0 | Single |
| 2 | K106 to 9: 1 Cs | 25 min | 6 | Rotate | notGp | 1.0 | Single |
| 3 | K1 to K8: 1 Cs ea. | 25 min | 6 | Rotate | * | 1.0 | Single |

TABLE 6-continued

SW Direct - Other terms to eliminate clusters dedicated just to answering incoming calls

| | | | col | | | | |
|---|---|---|---|---|---|---|---|
| | A | B | C | | E | | G |
| | cluster ID: | Call- | Calls | | Call | | call |
| r | number of | period | Assgd | D | Type | | station |
| o | call stations (Cs) | Max | per | Rights | Handled | F | Selection |
| w | each cluster | Duration | call-prd. | to Calls | | ION** | Method |
| 4 | K9 to K19: 1 Cs ea. | 25 min 6 | Rotate | All | 1.0 notGp | Single | |
| 5 | K51: 6 Cs | 15 | 10 calls | F.Rts | All | 2.0 | Order |
| 6 | K42: 5 Cs | 15 | 8 calls | F.Rts | All | 1.0 | Ratng |
| 7 | K34: 3 Cs | 15 | 5 calls | F.Rts | All | 1.0 | LastCall Cmplt Random |

*graphics software sales lines not handled
**Interruption Order Number

Figure 2:
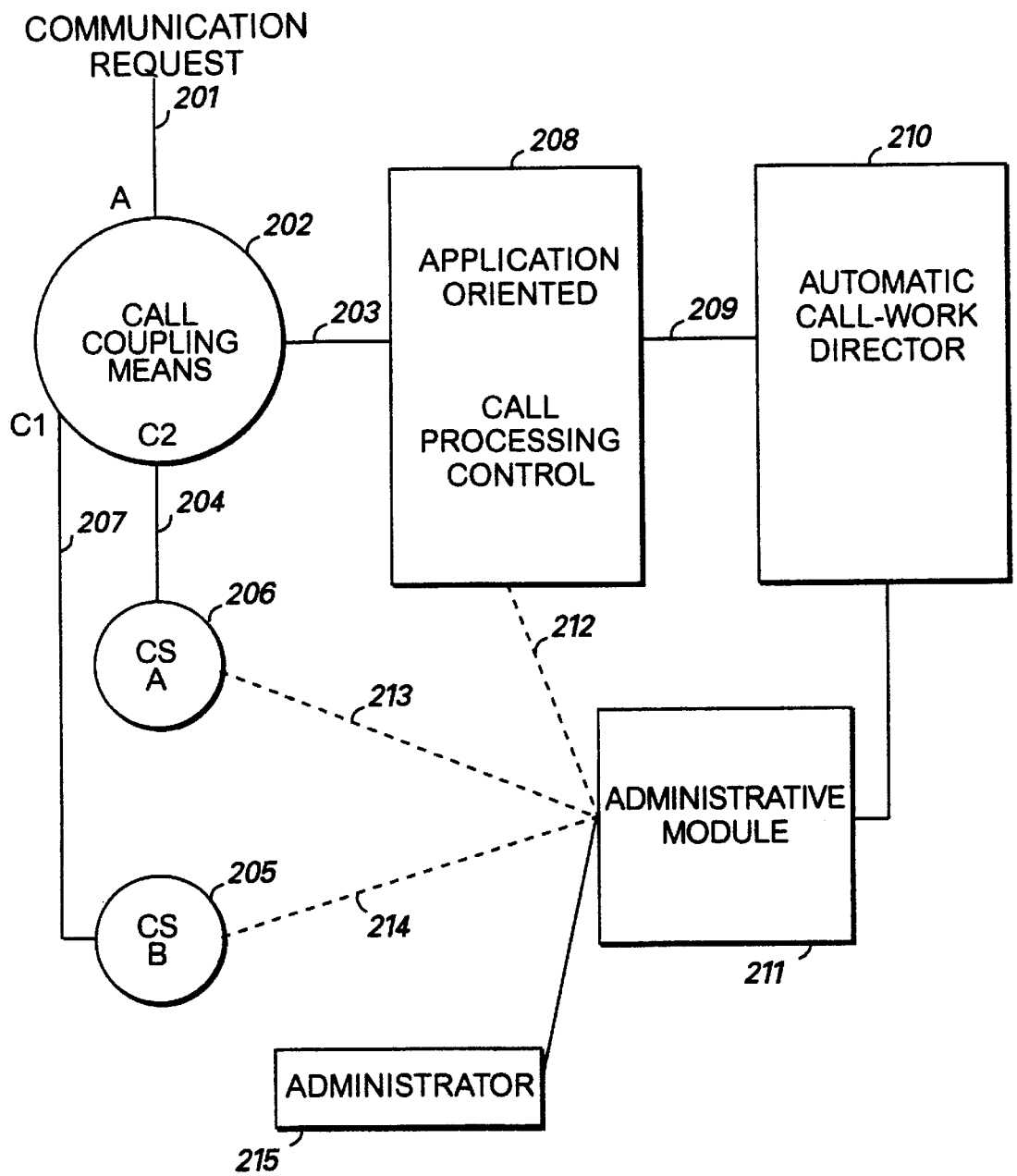
FIG. 2 shows interconnections for a call-coupling means, application-oriented call processing control, administrative module, and the present invention labeled the automatic call-work director.

Specific examples of the present invention have been presented and its flexibility in specifying terms which satisfy both call-handling needs and the requirements of the regular duties for preferred and reserve forces have been described. Now a generalized arrangement for deploying the invention is given in FIG. 2 which provides a graphical representation of directing calls to call stations in accordance with the present invention. A communications request of a type to be directed by the automatic call-work director 210 (ACWD) is received at port A 201 of call-coupling means 202. The ports labeled C1 and C2 provide access through communications paths 204 to call station $cs_{13}$ a and $cs_{13}$ b 205, 206. The call processing control 208 will direct the call-coupling means 202 in establishing a communications path between port A and ports such as C1 or C2. The communication request may refer to any type of call which will be routed to a person. The type calls that a person may receive are predetermined and included in the cluster record associated with the person.

The automatic call-work director 210 will choose a person that can take the type communications to be received and furnish that choice to the call processing control 208. The communications path eventually established may be for various applications and use any media for communications including text, text and graphics, voice, or video so long as reasonable estimates of the status (i.e., active or terminated) of the communications path can be made. When the communications request is received the call-coupling means 202 signals the application-oriented call processing control 208. The messages processed by the call processing control 208 and the call-coupling means 202 will depend upon the application. When a call of a type to be directed to a person by the automatic call-work director is received at port A of the call-coupling means 202, it signals the call processing control 208 and a message is sent to the automatic call-work director 210.

Table 7 below summarizes the message content of the basic messages passed between the application-oriented call processing control 208 and the automatic call-work director 210. The protocol of these messages will depend upon the application.

TABLE 7

Automatic call-work director 210: basic call processing messages

| message label | message contents | From and To |
|---|---|---|
| 1 | identity of new communications request; will explicitly or implicitly identify call type and may include a key to the caller's database records | call processing control 208 to director 210 (duplicate may be sent to administrative module 211) |
| 2 | call station to be coupled | director 210 to call processing control 208 |
| 3 | non-availability of a call station | director 210 to call processing control 208 |
| 4 | confirmation of call stations coupling | call processing control 208 to director 210 |
| 5 | failure of coupling attempt, request for new call station assignment | call processing control 208 to director 210 |
| 6 | completion of call | call processing control 208 to director 210 |
| 7 | abandonment of call | call processing control 208 to director 210 |
| 8 | transfer of call to another call station | call processing control 208 to director 210 |
| 9 | conferencing of call with other call stations | call processing control 208 to director 210 |

The first massage (message labeled 1) will pass a communications path identifier (hereinafter called the call identifier) to the automatic call-work director 210 and this identifier will be used for all further messages to identify the call that is the subject of the massages. The "key" referred to in the message labeled 1 may be just the caller's telephone number or billing number but in the case of a non-telephone application it could also be the caller's identity which resulted from a form being filled out on, for example, World Wide Web page.

The administrative module 211 may use the key in the duplicate message to query a caller database. It will then communicate the priority index to the automatic call-work director 210. If different type communications are being directed—such as calls to different telephone numbers representing services provided by different groups or persons, or calls using different media (text, text and graphics, video, voice) requiring specific communications devices—then with this first message will come an explicit identifier for the communications type. Otherwise the one type to be directed will be assumed. In telephone systems the type may just be a representation of the number of the line on which the call arrived or, if dialed number service is provided, of the digits that have been dialed.

The automatic call-work director 210 will respond back to the message labeled 1 in Table 7 with either the message labeled 2, providing the identity of a call station, or with the message labeled 3, reporting that no call station is available to take the type call received. Assume now that a message labeled 2 is returned to the call processing control 208 with a call station identity. The call processing control 208 attempts to have the call-coupling means 202 set up the communications path between the caller and the call stations. If the call-coupling means 202 fails in this attempt then the call processing control 208 upon being notified by the call-coupling means 202 will send the message labeled 5, a request for another call-station assignment, to the automatic call-work director 210. If the call is coupled by the call-coupling means 202 then the call processing control 208 will send the message labeled 4, confirmation of the establishment of the communications path. Confirmation of coupling to the call station results in posting the results of the assignment process along with the call identifier (and the connection identifier for the leg of the call attaching to the call station itself, if the call station identifier is not associated with this identifier by the call processing control 208 and used instead) to the records for the call station. When the call processing control 208 concludes that the communications session has ended and the communications path is broken it provides the message labeled 6 to the automatic call-work director 210. The completion of the communications and breaking of the communications path results in a separate small process in the automatic call-work director 210 which begins stepping through the call-station records searching for the call identifier and either the connection identifier or the call station identifier (depending upon which is furnished by the application oriented call processing control 208) of the completed call and upon finding the combination in a call station record enters the time of the completion in the record.

Notice of abandonment of a call prior to it being coupled to a call station is provided in message 7. In the automatic call-work director 210 this results in killing the internal processing of the assignment. (In some implementations this may involve reversing "in progress" flags in the call station record and reducing the "in progress" tally by one in the cluster record.)

The transfer message, labeled 8, may report a transfer already accomplished by the person at the original call station with help from the call processing control 208, or the transfer message may request a call station assignment for a person to whom the transfer will be made. In the former case the transfer message will furnish in addition to the call identification the call station to which the transfer was made. If the identified receiver of the transferred call is currently in a period of receiving calls the automatic call-work director 210 treats the transfer as an additional call in the call-period. Otherwise it treats the call as an exceptional one-call event, exceptional because the one call to one of a cluster's call stations does not affect the clusters eligibility for the next call-period—that is it does not count as an interruption or cause the start of the uninterruptible interval to be changed. If the transfer is to a call station to which calls are not directed by the automatic call-work director 210 the call is just cleared from the transferring station.

If the transfer message is a request for an assignment the message will provide a type for the call if the type has changed (if for instance the call came in on the service number when sales personnel were wanted). Such requests are treated exactly as new call requests except that if a call completion message is not generated by the call processing control 208 for the original segment of the transferred call, the record of the call in the original call station and cluster is marked completed using the time of the transfer as the call completion time.

A conference message labeled 9 is treated like a transfer from the first call station listed in the conference message, except that the last step in the transfer—marking this first call station and cluster with a completed call—is not performed when the conference is set up. The call processing control 208 must report the completion of each leg of the conference call using the call station identifier for that leg. If a call station brought into a conference is already interrupted the conference call counts as a call received for the associated cluster. Otherwise it treats the call as an exceptional one call event. A field for the call specific "connection identifier" may be added to the Call Station Master Table if the correlation between the call station and the connection is not kept by the application oriented call processing control 208. This identifier is used by a small call completion process running separately to post the time that each leg of the conference call completes.

Although these nine messages illustrate the basic messages required, there are many more that may for specific applications have to be dealt with by the automatic call-work director 210. For instance, should the call be forwarded from the call station to another call station no action will normally be necessary within the database of the call-work director 210 so long as the call processing control 208 retains the reference to the original call station to use in completing the call. If this is not the case then a field may have to be added to the each cluster record to accommodate the connection identifier for the new destination address to use in completing the call. As another example, it may be important for some applications for maintenance messages to be passed between the call processing control 208 and the automatic call-work director 210 noting when channels or services were unavailable. This could be important if some of the call stations were remotely located. Also status messages may be important: a message providing notice that alerting (i.e. ringing) the station has begun (which would be communicated in another message not shown in Table 7) may be important in certain applications in order to judge if progress is being made by the call processing control 208. This could help the automatic call-work director 210 in deciding whether communications has broken down and whether to kill the processing thread.

There are many such messages that could be added to the list in Table 7 and the use of them in applications will in most cases be readily implemented extensions that do not change the present invention in any substantial way, but rather relate to the robustness of the implementation or to the support for an application feature that is incidental to the innovations provided by the present invention. Such additional messages are consistent with the scope of the claims. A person skilled in the art of programming controls for devices used in communications will be able within the structure and methods described here to incorporate the automatic call-work director 210 to support the features of new and varied applications.

The administrative module 211 will receive messages from the application-oriented call processing control 208 from an administrator 215 as well as potentially from call stations 205, 206 directly. The primary purpose of these messages will be to keep the records of clusters and people in the automatic call-work director 210 up to date. The links to the administrative module 212, 213, 214, will pass data messages and may be over any convenient data network. The administrative module 211 will provide such security features as appropriate to insure only authentic updates reach the records within the automatic call-work director 210. The automatic call-work director 210 provides three messages that may be useful to people at call stations 205, 206 or to an administrator 215 for manually managing the receiving of calls which will pass through the administrative module 211:

1. an on-net indicator which shows TRUE if the person at the call station logged on and is available for calls. An application might let a person at a call station log out for short times by directly setting this indicator to false through the administrative module 211. (Optionally the associated cluster may be logged out.) This indicator is implemented by the automatic call-work director 210 by precluding from consideration for a call assignment any call station (or optionally any cluster) with a FALSE indication. This check is made at each step in the selection process.
2. a schedule override indicator which shows TRUE when the restriction of being within a commitment segment either to be interrupted to receive calls or to continue receiving calls is NOT to be observed. (If already interrupted coming to the end of the commitment segment will not end the call-period; and, if not interrupted then currently being outside a commitment segment will not preclude beginning an interruption.) This indicator is implemented as an "or" condition with the schedule term in evaluating both the interruption beginning terms and the interruption ending terms. At each step in the selection process either the indicator can be true or the schedule condition can be met and the beginning schedule term will be satisfied. Each time the terms for ending the call-period are reviewed if the schedule override indicator is TRUE or if still within the commitment segment then-the call-period will NOT be ended.
3. a "begin and end" override indicator which shows TRUE if the terms for beginning or ending a call-period (other than the schedule term) are NOT to be observed. This indicator is also implemented as an "or" condition with the interruption beginning and ending terms which are not schedule terms. It use still requires that the time still be within a commitment segment to either begin an interruption or to continue receiving calls, though the other beginning and ending terms will not apply.

The administrative module 211 should provide a means for communicating confirmation of the status of these indicators back to the call station.

The administrator 215 will communicate with the administrative module 211 in order to start and stop the system, establish new records for call stations and clusters, remove records, change the membership of clusters, update term parameters including schedules, generate reports of historical and current activity, and take action to maintain the directing system and manage call assignment under it. Some applications may with controls considered proper let people at call stations perform some or all of these functions.

With this generalized view in mind the operation of the present invention to choose call stations will be described in detail. The call station and cluster identifiers, call type specifiers, commitment segments, and other term parameters shown in the tables of the SW Direct example and in particular in Tables 6 and 7 are recorded for each cluster in a Cluster Master Table. The call stations are identified and associated with the cluster in a Call Station Master Table as further described later. Also included in each cluster record are:

the call-period indicator, which shows TRUE when in a period of receiving calls and FALSE when not in a period of receiving calls.

the on-net and override indicators described above.

a flag showing no-response from all of the call stations on an initial attempt to interrupt the cluster to take calls and a time interval to wait after a no-response before trying again.

the time that the last call-work session ended (used to compute the uninterrupted time). It is helpful to record the time that the last call completed for any call station to help determine this.

the number of interruptions thus far in the present interruption counting period.

the sequence number for the present interruption counting period (starting with "one" when in the first ICP).

a beta value for clusters which represent a large call-handling resources as discussed in connection with the Interruption Benefit Algorithm.

Fields particularly important to determining if terms for ending the call-period are met are:

the number of calls received in the call-period so far.

the start time of the call-period.

It is convenient to keep certain times in the cluster records that will often be checked so that they can be calculated once. These include the time that the maximum duration limit of the call-period is up and the time any "no response" suspension period is up and the start time of the call-work session and the time the current interrupt counting period ends.

Also the time the call-period ends will be useful. Since this can occur when any of the ending terms is satisfied, including when the agreed number of calls is received, the time the last call is received by any call station should be kept in the cluster record. A running tally of the number of active calls in a cluster is kept for deciding when the call-work session ends since that tally will have to reach zero. Other fields which record historic usage may also be included. Also, in each cluster record is a link to the record of one of the call stations making up the cluster. That record in turn contains a link to the next call station in the cluster and so forth until the last call station is reached as indicated by a null terminator in the next link field. A field showing the location of the reference to the cluster in the interrupted cluster list is included too.

The components of the call station record include fields to contain as required:

- a reference back to the cluster record.
- a reference to the next call station in the chain of the cluster's call stations (or a null terminator if this is the last call station).
- an identifier for the call station.
- a busy-with-call indicator.
- the call identifier for the call being serviced and other connection identifiers as required.
- the time the call that was last being serviced was disconnected.
- a call order number indicating the order that this call station is to be considered to take a call offered to the cluster.
- a field indicating coupling of a call to the call station is in-progress.

In addition other fields helpful to administrating the service provided may be included such as:

- an "on net" indicator, indicating that the call station is voluntarily available, or not, for calls.
- a "no response" indicator, indicating that the call station has not responded to a recent call assignment attempt.
- a default period to wait after the no response indicator is set before retrying.

Throughout both records it will be convenient to locate various statistical fields which continuously measure the holding time and the interarrival time for calls. In addition to these records a table of constants and default values is useful.

Figure 3:
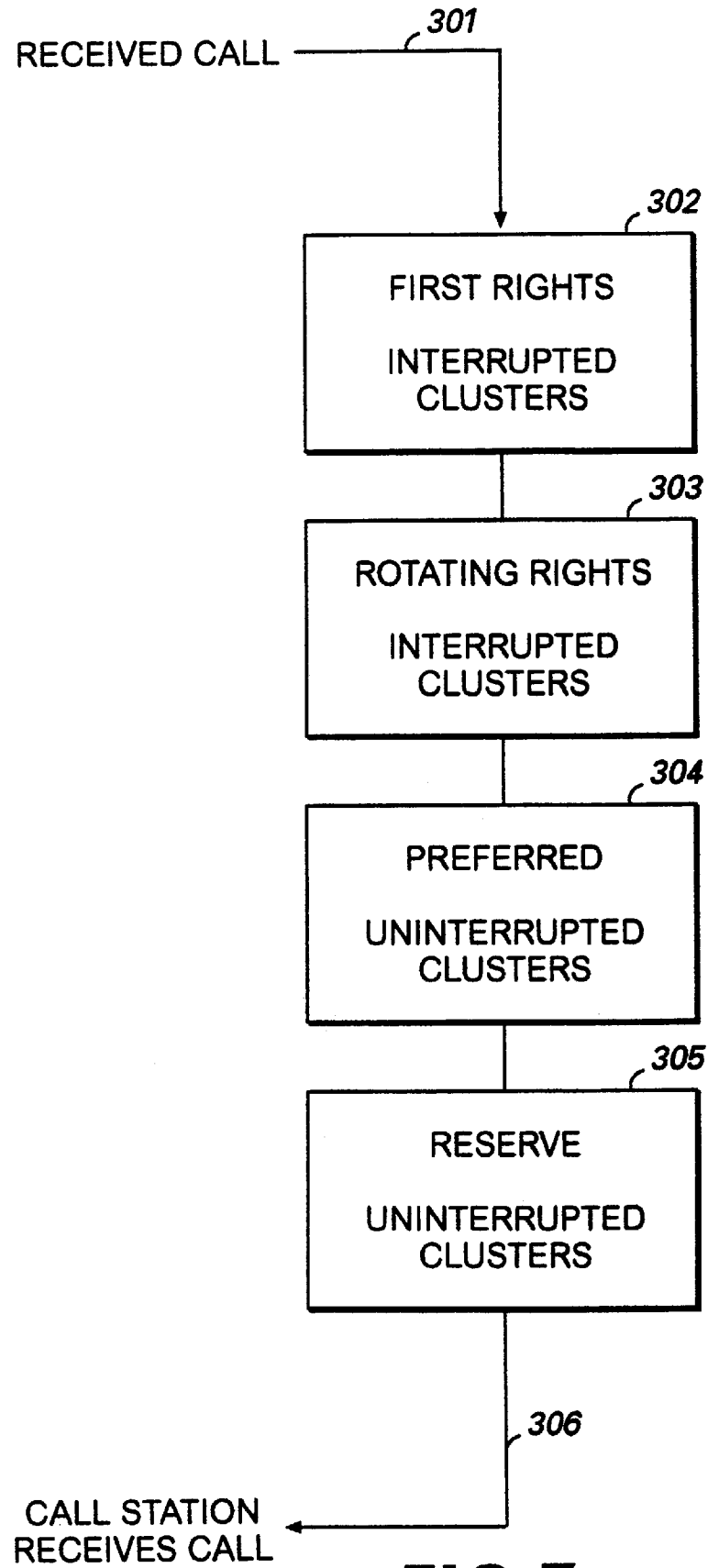
FIG. 3 shows the overall plan for directing call-work to call stations.

FIG. 3 illustrates the plan for providing a call station assignment for a call received 301 at the call-coupling means 202. The top two blocks 302, 303 represent interrupted cluster lists and contain cluster references back to the Cluster Master Table. They persist from call to call, being updated with new entries or deletions as clusters enter and leave their periods of taking calls. In selecting an interrupted cluster various temporary lists are made from the references within the interrupted cluster lists represented by these blocks 302,303.

The bottom two blocks 304, 305 in FIG. 3 refer to other lists containing references to cluster records in the Cluster Master Table, but this time the clusters are not yet interrupted. New lists 304, 305 are made for each call that causes uninterrupted clusters to be considered. They contain references to clusters which have satisfied their terms for being interrupted to serve the call.

In each of the blocks of FIG. 3, the clusters referenced within the block that can take the type call received will be reviewed to see if any of their call stations (e.g., 61, 62, 63, etc.) take the call. If none do, an assignment of a call station is next attempted from among the clusters in the next block that can take the type call received.

An assignment of a call station to take the received call 301 is first attempted from among the call stations associated with the "first rights" clusters of block 302. These clusters have rights to a call that depend upon the time of their interruption to begin their current call-period: While it has an available call station the first rights cluster that began its call-period first will be offered every call received which is of a type that it can receive. Should no call station be coupled to the call at block 302 an assignment will be attempted from block 303. The clusters in this block rotate in taking calls of a type they can receive according to the idle time since completion of the last call (regardless of type). Should no call station in an interrupted cluster be coupled to the call at blocks 302 or 303, the lists labeled 304 and 305 are formed by stepping through the Cluster Master Table and finding all of the available uninterrupted clusters that can take a call of the type received and whose terms for beginning an interruption are satisfied. References to these clusters that can take the type of call received are placed in either the preferred list, block 304, or the reserve list, block 305, according to their predetermined designation as preferred or reserve clusters. These list of available uninterrupted clusters are formed for this call only. All of the clusters and call stations in the preferred list are reviewed and offered the call before beginning a review of the reserve clusters.

The attempt to couple the call to a call station moves from chosen call station to chosen call station within a selected cluster and from selected cluster to selected cluster within the current block and from the current block to the next block within the overall process until the call is coupled to a call station 306, in which case all intervening blocks between 306 and the block in which the call station was found are skipped.

Figure 4:
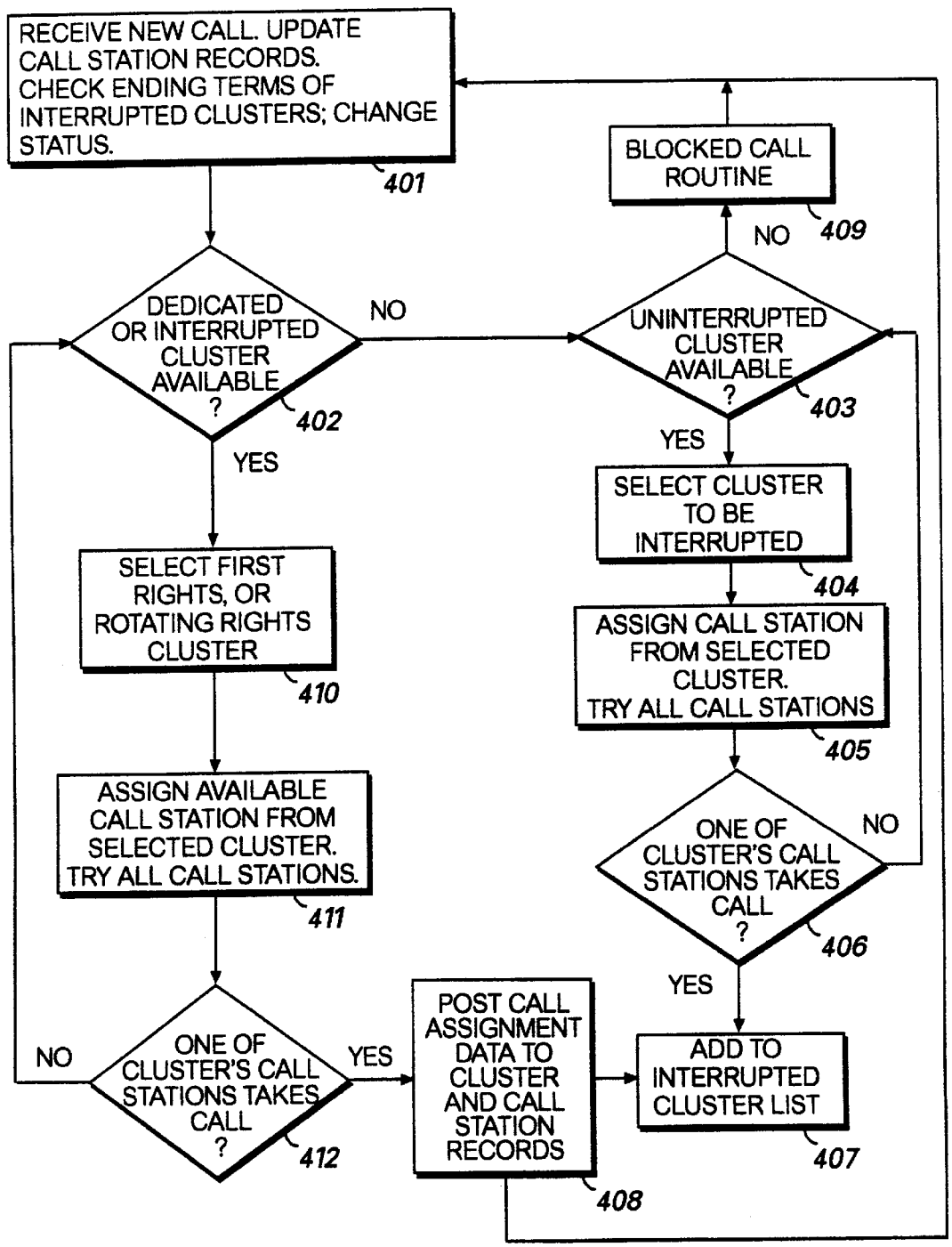
FIG. 4 provides more detail on the system for directing call-work to call stations.
Figure 5:
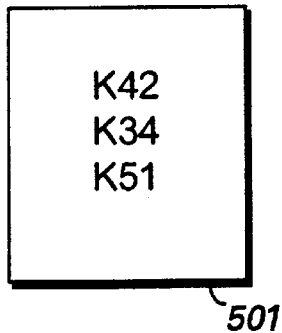
FIG. 5 provides a graphical representation of the method for selecting a cluster from those that have already been interrupted and are still in a period of receiving calls.
Figure 5:
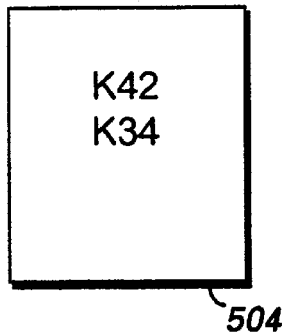
Figure 5:
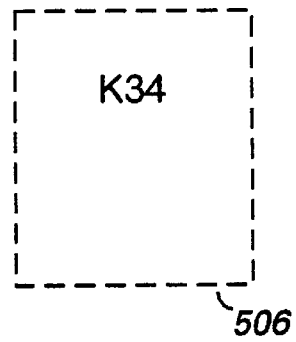
Figure 5:
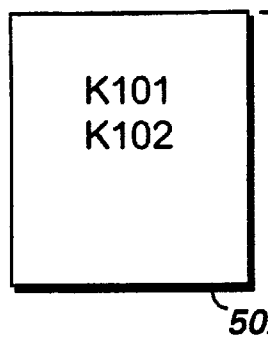
Figure 5:
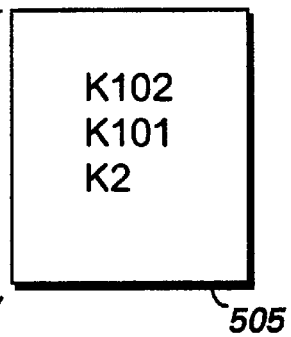
Figure 5:
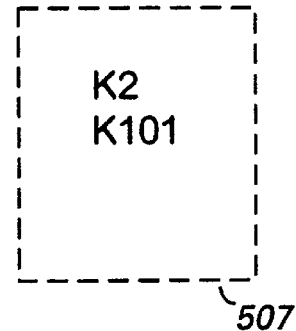
Figure 5:
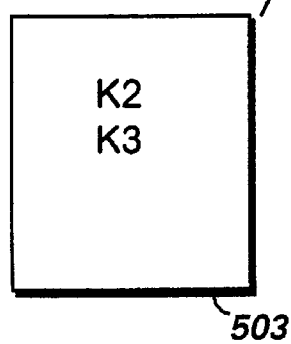

FIG. 4 discloses in more detail the steps of the present invention in processing a new call. The first step in FIG. 4, block 401, begins in response to the host call processing control 208 originating a message signal with a call identifier to the automatic call-work director 210 (ACWD) indicating that a call has been received which is of a type to be directed by the ACWD 210. The call identifier in this message provides a means of identifying which call is the subject of future messages between the call processing control 208 and the automatic call-work director 210 over a communication path 209 (FIG.2) appropriate to the implementation. Table 8 below describes the parts of this message signal. If a telephony implementation the call processing control 208 may have the calling number or Automatic Number Identification (ANI) number available. Using these numbers a caller database is accessed to obtain the priority index which is furnished to the ACWD 210. The call processing control 208 may provide the priority information whether the automatic call-work director 210 is incorporated into the call processing control 208 for the telephone switch or not. Alternatively, in a more decentralized implementation an administrative module 211 can receive a message from the call processing control 208, get the priority index from a caller database, and furnish it to the ACWD 210. Other non-telephone call-coupling 202 and call processing control means 208 such as web page servers can develop priority index in many ways. These include having people fill out forms to quantify the importance (and the priority index) of establishing a communications session. (Such sessions may use text, text and graphics, voice or video and be assisted by applications such as Microsoft's "NetMeeting" product.)

When the call-coupling 202 and call processing control means 208 are embodied in a telephone switch then the call type may just be the identity of the line on which the call was received. However, if dialed number identification is furnished, the digits dialed by the caller may provide a more accurate definition of the call type. If different type calls are to be directed, whatever form of alphanumeric identification that will be available from the call processing control 208 must be placed in the cluster record to indicate the call types that will be serviced by cluster's call stations.

TABLE 8

Signal denoting received call

| Message | To and From | Use |
| --- | --- | --- |
| Identification to be used in communicating about call | Sent from call-processing control 208 (CPC) to the automatic call-work director 210 (ACWD) | Provides call identification and notice that a call to be assigned a person under the terms directed by the present invention has been received. |
| Priority index of the received call | 1) CPC 208 to ACWD 210 or 2) From the administrative module 211 to ACWD 210 | Provides a decimal ranging from 0.0 to 1.0 proportional to priority of caller, where 1 denotes the highest priority caller |
| Type of the received call | CPC 208 to ACWD 210 | Provides a type identifier for the call. Used when more than one type of call is directed by the automatic call-work director 210. |

The details of the composition of the message signaling a call for which a destination address is needed will depend upon the specific call processing control 208 and the features implemented.

When a person at the chosen call station accepts the call then the call identifier is recorded in the Call Station Master Table. When the call completes the call processing control 208 provides a completion notice with the call identifier and an identifier indicative of the call station (the call processing control 208 should be able to obtain and furnish the call station identifier; however, an alternative implementation would be for this latter identifier to be replaced with a call-specific "connection identifier" which will have been posted to a new field in the call station record in the Call Station Master Table when the call was first coupled to the call station.) A small posting process running separately posts the completion time to the record of the call station that was handling the call. In block 401 when the ACWD 210 initiates processing to assign a call to a person, it starts by first stepping through the master records of the call stations from beginning to end looking for the completion times that have been posted since the last such update. Records where the period has lapsed for not considering a call station due to it not responding earlier to a call will be returned to active status by changing the "noResponse" flag field from TRUE to FALSE.

Besides changing the busy-with-call indicator to FALSE for call station records where call completions have been posted since the last update, this block 401 routine changes some other fields:

The "callsWorking" field in the cluster record associated with the call station is decreased by one each time a call is completed;

If the "postEndOfCallWorkSession" flag is TRUE and if the callsWorking field has just been updated to "zero" then the ACWD 210 posts the time of completion of this last call to the "endingTimeOfCallWorkSession" field. This flag is set to TRUE to indicate that the ending time of the call-work session is to be posted when the last active call completes—that is, when the "callsWorking" field is changed to zero. The end of the call work session is needed for the uninterruptible interval goal and term. The "postEndOfCallWorkSession" flag for the cluster is then reset to FALSE.

When the end of a session is found in the call completion routine then a number of statistics may be generated at this point which are useful to the Interruption Benefit Algorithm. These include the cumulative sessions and session length, the running average session length. To be of most use sessions which include a call-period which ended abruptly by passing the end of a commitment segment should be tallied separately since it is the average length of those that do not end abruptly that is of most interest. If not accumulated here these statistics will have been gathered earlier when one or more of the interruption ending terms was satisfied and the call-period completed.

In the call station record the call completion time for the completed call is copied to the prior call "callCompletionTime Field" and the current call field of the same name is reset;

In the cluster record associated with the call station the "lastCallCompletionTime" field is updated by copying this latest completion time into it.

In the call station record the call receipt time for the completed call is copied to the "priorCallCallReceivedTime" field and the current call receipt time field is reset to a null value.

As part of step 401 after the update of the completed calls data described above, an update is made of the records of those clusters whose references appear in the interrupted cluster lists. This update determines if the call-period has ended for any interrupted clusters and if so to change the call-period indicator associated with such clusters from TRUE to FALSE and so brings the cluster records up to date in preparation for finding in block 402 if any interrupted clusters are available. The call-period indicator was set to TRUE when the cluster was interrupted (or given dedicated status) to begin a call-period. Also the ending time of the call-period is posted and if the callWorking field is zero the time is posted to ending time of the call-work session as well. But if the number of active calls is greater than zero the "postEndOfCallWorkSession" flag is set to TRUE and will signal the call completion review routine to post the time that the last call ends to the session ending time.

The terms for ending the call-period are satisfied under multiple conditions: if the time since the start of the call-period has passed beyond the time for ending the call-period specified by the duration limit, or if the number of calls to be received has been received, or if the end of the commitment segment has been passed. (Only the last test is made for clusters classified as dedicated to call handling work.) The ACWD 210 steps through the interrupted cluster lists and, using the references there to get the ending term parameters from the clusters records in the Cluster Master Table, evaluates the terms for ending the call-period. The references to those clusters satisfying one or more of the ending terms are removed from the appropriate interrupted cluster list and have their call-period indicators returned to the FALSE condition. The "hole" left in an interrupted cluster list is removed by moving all cluster references with indexes greater than the removed index down to the next lower list location. This is accomplished by stepping through the appropriate interrupted cluster list starting at the index location of the cluster reference being removed and moving each reference down one location and then changing the index in the cluster record to correspond to the new location. Also in the master record field for clusters satisfying the ending terms the field tallying the number of calls received in a call-period is reset to zero and field containing the ending time for the call-period is reset to its null value.

Though the active period of receiving calls (the call-period) has ended for a cluster the call-work session may continue if the cluster is presently handling calls. As mentioned in this case the cluster's "postEndOfCallWorkSession" flag is set to TRUE so that, as described above, the routine that updates call completion events in block 401 for the call station and cluster records will know to enter the time that the last active call completes in the cluster field showing the ending time for the call-work session. This time is used in determining the amount of uninterrupted time since the end of the last call-work session for comparision to the goal, if one is specified.

SELECTION FROM AN INTERRUPTED CLUSTER LIST

As the ACWD 210 steps through the interrupted cluster lists, besides checking to see if the clusters are still in a period of receiving calls, it also makes lists of those clusters that can take the type of call received and which have call stations that meet these tests for being available: are not presently busy with calls (a busy-with-call indicator of false), on-net to take calls, are not in the immediate process of receiving a new call, and are not in a suspension period due to a prior "no response" to a call. If this list of interrupted clusters with available call stations is not empty, then the ACWD 210 will assign a cluster from it to receive the call, as briefly described in FIG. 3 and as further explained below.

Dedicated clusters are treated by the ACWD 210 as just a special case of previously interrupted clusters—the case where only commitment segment schedule terms apply in beginning and terminating the period for receiving calls. (The call stations of dedicated clusters must still satisfy the conditions given above before being chosen.) For processing it is convenient to list in the interrupted cluster list all dedicated clusters that are entered into the Cluster Master Table when first forming the interrupted cluster list. Sub-lists used for selecting a cluster are built to only include those dedicated clusters which are currently scheduled—where the current time is within a commitment segment.

Consider now the assignment of a call which arrives after one or more clusters have been interrupted so that the interrupted cluster lists 501, 502, 503 are populated. To assign this call from a call station in a cluster which is referenced in one of the interrupted cluster lists—dedicated, first rights, or rotating rights—two lists of interrupted clusters with available call stations are prepared. The list 504 contains all clusters from the first rights interrupted cluster list still in its call-period after the ending terms are evaluated, which can take a call of the type received, and which have available call stations. The second list 505 contains all clusters in either the dedicated interrupted cluster list or the rotating rights interrupted cluster list that are still in their call-period, can take the type of call received, and which have available call stations. (The clusters themselves must also be shown as "on-net" and not be in a suspension period due to not responding to a prior call assignment.) An additional entry is made in the list 505 beside the reference to the rotating rights clusters and the dedicated clusters —the completion time of the call station within the cluster that would likely receive the call. This is used to select the cluster from among those listed. The clusters on this list 505 rotate in receiving calls: The cluster that has the oldest last call completion time for the call station that would likely be chosen will be selected. (For clusters with the selection criterion of order number the oldest last call completion time must come from a call station which also has one of the lowest order number ratings of any available call station)

The lists 504, 505 of first rights and rotating rights clusters are populated for receiving this one call only with the references of eligible clusters that can take the type call. There will be repopulated when the next call is received. The references are placed into these lists so that the first position is occupied by the cluster to be selected. For the first rights list 504 this is the cluster which began its call-period first. For the rotating rights list 505 the cluster with the call station likely to be chosen with the lowest last call completion time is in the first position. Should all the call stations in the selected first rights cluster fail to accept or otherwise not respond to the call 411, 412 then this cluster in the first position is eliminated from the list and the remaining clusters are reshuffled, using the same selection criteria, until the first position in the reshuffled list 506 is occupied by the cluster to be selected.

If all of the first rights clusters are eliminated. The cluster in the first position in the rotating rights list 505 is then selected. If it does not take the call then this list is reshuffled 507 using the completion time criteria and the cluster that ends up in the first position is again selected and so forth until the call is successfully coupled to a call station within the selected cluster or all the clusters are eliminated.

Notice that there is just one list for the available dedicated and rotating rights clusters that can take a call of the type received 505 because both of these kinds of clusters rotate together in receiving telephone calls using the time since the last call completion criteria. The completion time of the last call of the call station that would be selected is used to choose the single cluster to be offered the call.

For the clusters in the rotating rights list determining which call station's oldest last call to use to represent the cluster depends upon the selection method specified for the cluster. The last call completion time used in selecting among eligible interrupted rotating rights and dedicated clusters is found while looking at the individual call stations to see which are busy. The last call completion time for the first of a cluster's non-busy call stations is recorded to test against the completion time of other non-busy call stations which when reviewed may replace it. If either "completion time" or "random selection" is the position selection method for a cluster then the last call completion time for any call station will become the cluster's oldest last call completion time. However, if the method of position selection is "call order number" then the completion time of the position with the low call order number becomes the cluster's lowest-completion-time. If a call station in this cluster is found with a last call completion time lower than the call stations in the cluster reviewed so far then before the new lower completion time will become the low completion time for the cluster it must also have a call order number which is the same or lower than the previous call station with the lowest completion time. In clusters using the call order choosing method for call stations the reason for this rule is to prevent high call order number positions, which by virtue of their high call order number may not often be chosen, from defining the last-call low completion time for the entire cluster.

A call station is assigned from an interrupted cluster in block 411 and accepts in block 412 according to the procedure detailed in the CALL STATION ASSIGNMENT section.

If no call station is assigned and if there are no further interrupted clusters to review then block 402 produces a "No" and uninterrupted clusters are considered starting in block 403.

SELECTION FROM UNINTERRUPTED CLUSTERS

Consider now the call for which there are no call stations in interrupted clusters that can take it. The records of clusters in the Cluster Master Table will be stepped through. For those that can take a call of the type received and which have call-period indicators of FALSE the terms for interrupting them will be evaluated. At this time 404 if the "noResponse" field indicates TRUE then, prior to evaluating the terms, the time set in the cluster "timeNoResponseLapses" field is compared to the current time and the noResponse field is changed to FALSE if that time has passed. The noResponse field will have been set to TRUE if on an initial attempt to interrupt a cluster none of its call stations take the call.

The following are the major parameters contained in the Cluster Master Table for the clusters which are used in evaluating the call-period beginning terms in this embodiment of the ACWD 210:

1. Time segment beginning and ending times, called commitment segments, during which the cluster is committed to begin a call-work session if needed and if the other terms specified are met;
2. The length of an uninterruptible interval goal parameter following the end of a call-work session during which the cluster may not be interrupted except to the extend that the length of this interval is modified by the priority system;
3. A interval length, the priority concession interval, which can be used to reduce the length of the uninterruptible interval goal. The amount of the priority concession interval subtracted from uninterruptible interval is proportional to the priority of the caller;
4. The length of the interruption counting period (ICP). By default the time the ICP starts is the beginning time of the first commitment segment in the work day. The minimum length of an ICP for a cluster is equal to the length of an uninterruptible interval goal plus the expected length of a call-work session;
5. An objective for the maximum number of interruptions in an interruption counting period.

As each cluster is reviewed a determination that the terms that are specified (that is, have non-zero parameters) for beginning an interruption are satisfied is made as described below:

1. The current time must fall within one of the predetermined commitment segments when the cluster is available for interruption. The current time is compared to each of the commitment segments on the schedule until it is found to be within one of them or until all the intervals have been examined.
2. The uninterruptible interval term is considered satisfied either if this is to be the first interruption in the first commitment segment of the work day or if the time since the end of the last call-work session exceeds the specified uninterruptible interval goal parameter, as adjusted for the priority of the caller. To adjust for the priority of the caller when a priority feature is supported, a priority index must have been received by the ACWD 210. This index varies from 0.0 to 1.0. When the automatic call-work director 210 receives the priority index it will multiply it by the priority concession interval, and the product will then be subtracted from the uninterruptible interval goal parameter to produce the adjusted uninterruptible interval. It is this adjusted uninterruptible interval that is compared to the actual time since the end of the last call-work session. If this actual time that has elapsed without interruptions is greater than the adjusted uninterruptible interval then the uninterruptible interval term is satisfied, otherwise it is not.
3. The first ICP by default begins with the start of the first commitment segment, though a separate starting time could as easily be provided. There may be several ICP's in the day or just one. When an interruption occurs an ICP interruption count field in the Cluster Master Table is incremented. When a new Interruption Counting Period begins this field is set back to zero. A comparison is made between this ICP interruption count field and the goal for the maximum interruptions for the cluster. The term is satisfied if the ICP interruption count field is less than the maximum number of interruptions specified for the cluster. The ICP is known by its sequence number. The ICP sequence number field is re-calculated before in evaluating this term. If the sequence number of the current ICP has changed since the last re-calculation, the number of interruptions in the current ICP field is reset to zero. To calculate the sequence number the automatic call-work director 210 adds one to the integer value of the quotient obtained by first subtracting the start time of the cluster's first commitment segment in the day from the current time and then dividing by the objective length of an ICP.

As each cluster is reviewed a reference to each one that can take a call of the type received which has satisfied all of its terms is placed either in the preferred clusters list 602 or the reserve clusters list 603. If the number of clusters in these lists is nonzero, there are eligible uninterrupted clusters found and block 403 produces a "Yes". The automatic call-work director 210 proceeds now by finding an appropriate cluster to assign from the preferred cluster list 602 which is a cluster with the single lowest interruption order number or one chosen from among the clusters with the low interruption order number by the Interruption Benefit Algorithm. Failing to find a call station to take the call from within the preferred clusters, the same procedure is applied to clusters drawn from the reserve cluster list 603. A selection will be made from the reserve cluster list 603 only if there are no clusters in the preferred cluster list 602 or if all of the call stations for the eligible clusters in the preferred cluster list do not take the received call producing "No" in block 406. The interruption order number is used with both of these lists to further narrow the selection process. This number specifies the order predetermined for interrupting clusters. It need not be unique.

At the time the Master Cluster Record is stepped through and the eligible uninterrupted clusters are placed into the preferred and reserve cluster lists 602, 603 the interruption order number is read and used to sort the selected clusters so that they are in order in these lists by the interruption order number. While in block 304 a further listing 604 is made of the preferred clusters with the same lowest interruption order number. If there is only one cluster in the list being considered with the lowest (first to be selected) interruption order number then it is selected 606; otherwise, the Interruption Benefit Algorithm 605 is run on the list of the preferred clusters with the same lowest interruption order number and this algorithm selects a cluster 606. Should no call station in a preferred cluster take the call then the list of reserve clusters 603 is processed in exactly the same manner as described for the preferred clusters.

When each cluster is selected, a call station to take the call is chosen from the selected cluster according to the methods described in the following CALL STATION ASSIGNMENT section. The working of the Interruption Benefit Algorithm 605 is described in detail below in the section by that name.

If the cluster selected from the list of low interruption order number clusters 604 fails to produce a call station to take the call 406, the low interruption order number list 604 is reviewed again 403 excluding the cluster that did not take the call and a new eligible cluster is selected 404. This continues until a call station is found 405, 406 or the preferred or reserve cluster list is exhausted without finding a call station.

When all of the call stations in a cluster thought eligible do not take the call two treatments are possible. If this is the first attempt to interrupt a cluster, the cluster as a whole is marked as non-responsive by placing a TRUE in the cluster's noResponse field in the Cluster Master Tables 601. A time when the cluster can be reconsidered is also placed in a field in the cluster's record. A cluster update procedure runs before a cluster is selected as part of block 403 for the purpose of reviewing these no response suspension periods and resetting the no response indicator when the period expires. For the suspension period time the automatic call-work director 210 will not have to query all of the call stations again on each call to find out that the cluster members are all unavailable. If this is not the initial call that would start a call-period for the cluster, then the cluster still needs to be excluded for the duration of the processing of this one call. This is accomplished by placing the call identifier for this call in a field of the cluster record and not considering the cluster while this field matches the identifier of the call being processed.

Should the application of described cluster selection methods on the reserve cluster list fail to result in a call station taking the call then there are no uninterrupted clusters available 403 and the call will be blocked from service by a person and a message labeled 3 in table 7 will be generated to the call processing control 208 indicating that no call station is available to take the call 409.

Whenever in the above process a call station is found a message as described in connection with Table 7, message label 2, is provided to the call processing control 208 which directs the call-coupling means 202 in setting up the call. A coupling failure message (Table 7, message label 5) triggers the repeating cycle described above which will produce another call station to assign, if an eligible one is found.

Once the call processing control 208 has signaled that the call has been accepted, starting the call-period, the automatic call-work director 210 places (block 407) a reference to the cluster in the appropriate one of the three interrupted cluster lists described earlier and notes the location in the selected cluster's record in the Cluster Master Table. This reference to the cluster stays in the appropriate interrupted cluster list until one or more terms for ending the period of receiving calls is satisfied, as described earlier. The busy-with-call indicator of the chosen person is set to TRUE. Other fields are also updated 408: The call-period indicator of the selected cluster is set to TRUE. The current time is entered in the start of the call-period field in the cluster record. If this is the first call-period in the call-work session (active call count is zero) then the current time is also entered in the start of the call-work session field. The count of the number of interruptions which start call-periods in the current ICP is increased by one. The time that the call-period duration goal will be reached is calculated and entered in a field. The number of calls received in the call-period is set to one. In the Call Station Table the call identifier provided by the call processing control 208 is posted in the record for the chosen call station and other fields described in the next section are updated. A connection identifier may also be posted.

CALL STATION ASSIGNMENT

Figure 6:
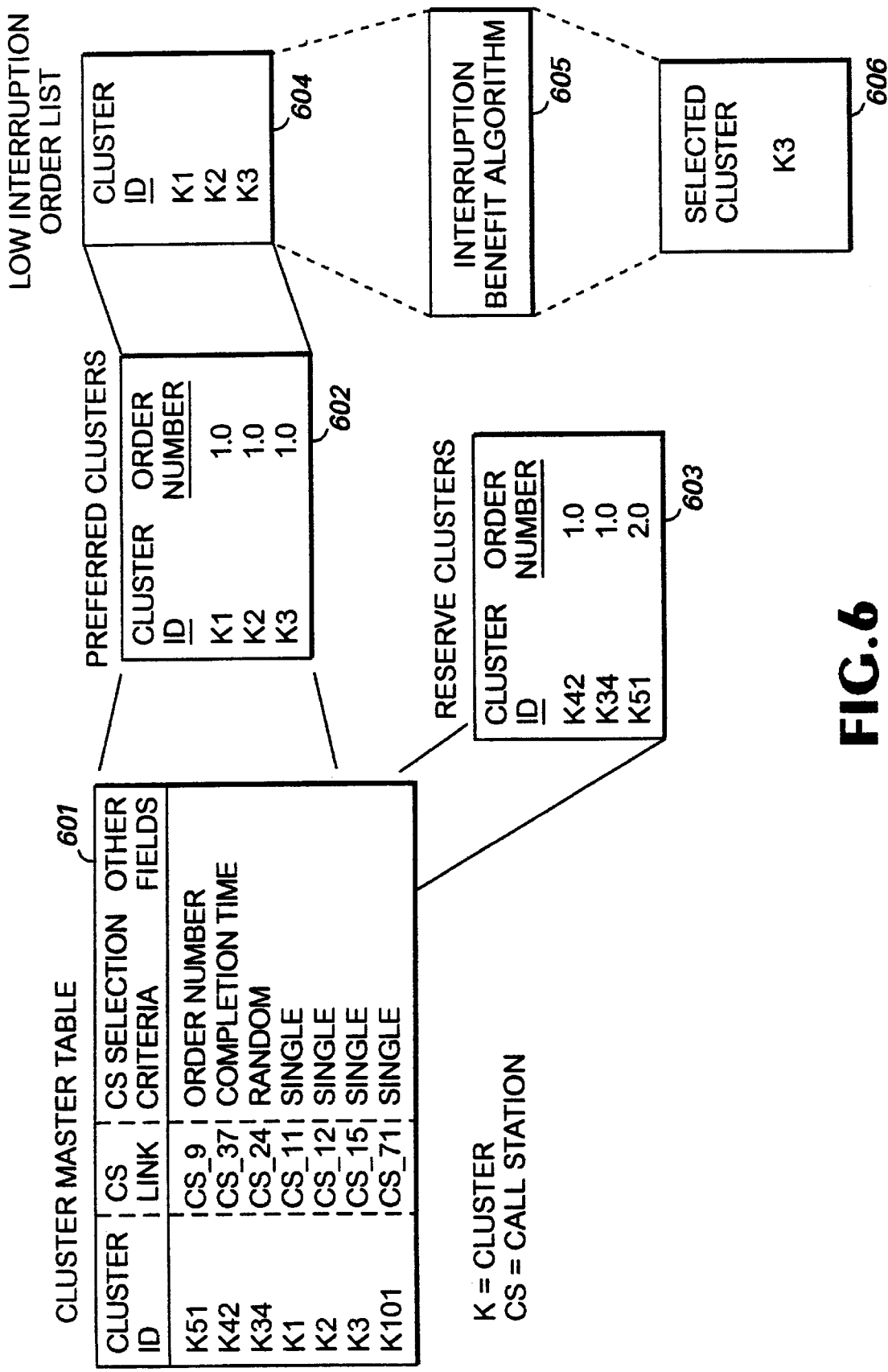
FIG. 6 provides a graphical representation of the method for selecting a cluster from those that have not yet been interrupted.
Figure 7:
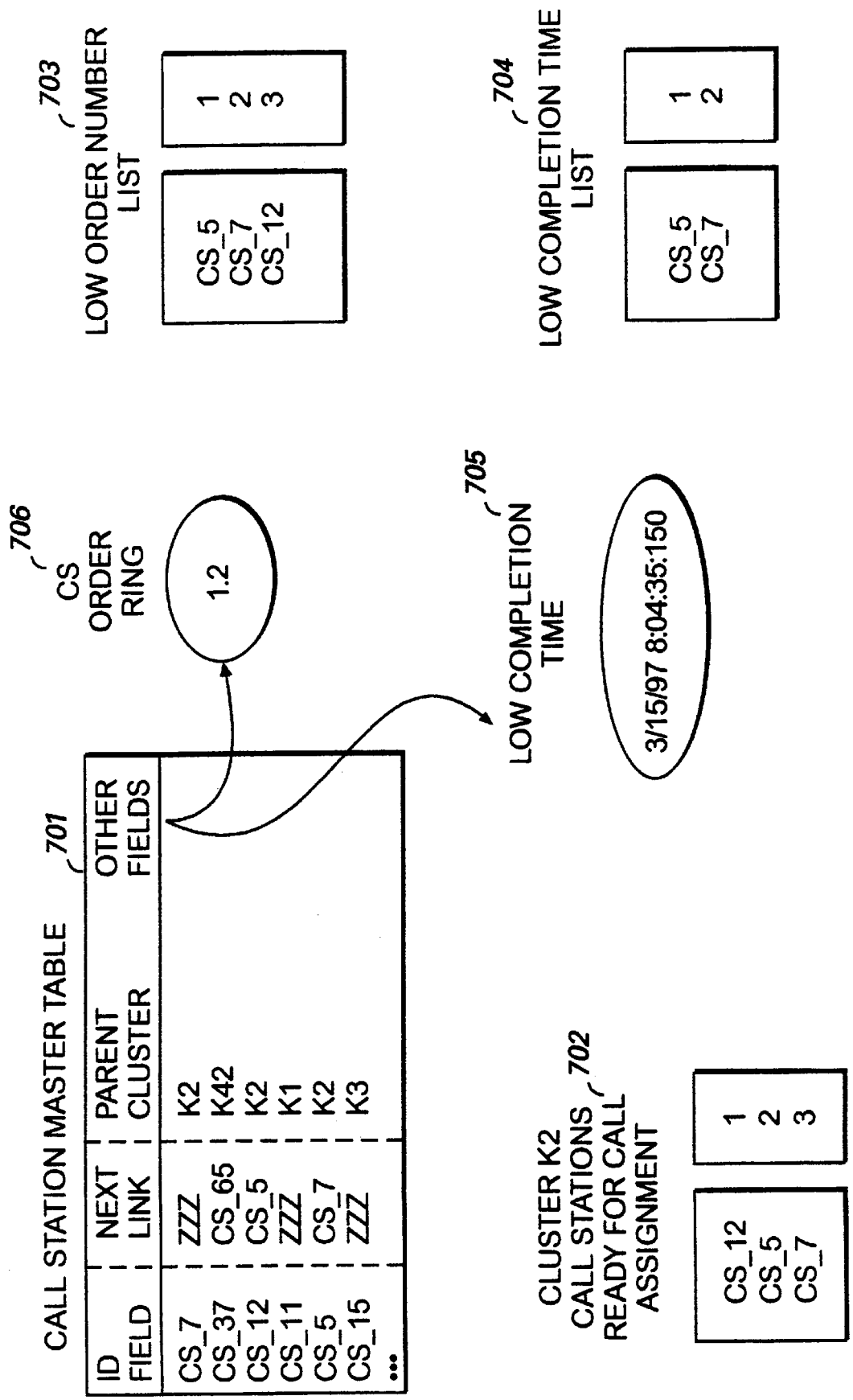
FIG. 7 provides a representation of the steps for choosing a call station from a selected cluster.

FIGS. 6 and 7 show the steps for choosing a call station in the selected cluster. Three methods are provided to select the call station and each cluster may have a different one, 601 as illustrated in FIG. 6. Using the cluster identity as a key the method to be used is obtained from the Master Cluster Record 601 column C, along with the identity of the link call station in column B which is used to access the Call Station Master Table.

Two of the three methods are well known for selecting a call station to take a call. These are first, the "completion time" method which uses as a selection criteria the time that has elapsed since the last call and selects the call station that has been idle the longest; and, second the random selection method which just uses a random method of selection. The third method offered is the call order number method which allows the order in which call stations are considered to receive calls to be predetermined. This number need not be unique. When two or more eligible call stations have the same call order number, one of the other two methods is used to decide which call station to choose.

The call order number selection method helps provide the flexibility needed when taking into account the other regular work that is being done. For instance, considering the regular work for a cluster with multiple call stations it may be desirable for one person at a designated position to shut down the regular work while the other people in the cluster begin taking calls. The call order number for this person can be set to be higher than the others thus affording this person more time before the first call comes in to their position, as well as time during the session. Likewise one highly skilled person at a call station could be designated to be first to receive calls during the call-work session when they are available, thereby relieving other positions from taking so many calls.

For all these methods choosing the call station 406 begins by stepping through the call stations in the Call Station Master Table associated with the selected cluster. Using the identity of the link call stations all of the call stations in the cluster can be found. The call stations are linked one to another through a "next link" field in each call station's record that points to the next call station in the cluster. The call station link in the selected cluster's record in the Cluster Master Table is the first link in this chain. The last call station in the chain has a "no more call stations" flag in the field, which may be a null, where the link to the next call station would be. Each call station record also has the label of the associated cluster to which it belongs as one of its fields so the cluster can be found from any call station. By successively reading these references beginning with the call station label listed in the selected cluster's record the cluster's call stations are stepped through and each call station's parameters reviewed. Those found eligible to be assigned a call are referenced in an eligible call station list 702. To be eligible the call station must not now be busy, must be marked as "on-line" to receive calls, and must not be marked "no response" or "in progress." A TRUE is placed in the noResponse field if there has recently been no response to an attempt to couple a call to the call station. A TRUE will be placed in the "in progress" field during the time that an attempt is being made to couple a call to the call station. If this field is TRUE it means an attempt is presently being made to assign an earlier call to the call station.

If the random method is to be used to select the call station then the number is computed and the call station is selected directly from the list of eligible call stations 702. Otherwise, the references to the eligible call stations associated with the selected cluster are placed either in a Low Call Order Number list 703, or a Low Completion Time List 704 depending upon the selection criteria in the Cluster Master Table 601. The call station references are ranked and sorted according to the value of the selection criteria 705 and 706 taken from the Call Station Master Table. A multistage approach serves to settle ties. Table 10 shows the relation between the stages.

The random selection method is a single stage method, the other two are implemented in three stages. When the random method is used then a random number is computed which ranges from 1 to the number of call stations in the call station ready for assignment list 702. The call station at the position of the random number in the list of eligible call stations becomes the one selected to receive the call.

The two other methods are multistage only if the first or second stage results in two or more call stations tying in meeting the criteria for the stage: either having the same oldest last-call completion time (considered unlikely but possible) or the same call order number (much more likely since these numbers need not be unique). If a tie results, the next stage's method is used to break the tie. The third and last stage in the first two methods is a random selection from among the tying call stations which will always result in a single call station being chosen.

TABLE 10

Call station assignment method choices

| | Method Name | 1st stage method | 2nd stage method | 3rd stage method |
|---|---|---|---|---|
| 1 | completion time | last call low completion time assignment | call order number assignment | random assignment |
| 2 | call order number | call order number | modified last call low completion time assignment | random assignment |
| 3 | random assignment | random assignment | none | none |

The selected call station is notified of the incoming call according to methods incorporated into the call-coupling equipment, usually either by being rung over the telephone line to the telephone instrument at the call station or by being notified with a message over a local area network that communicates with a program running in a processor at the call station. The result of ringing or otherwise notifying the call station of the call will be that the call station goes "off hook", or provides notice over a network of its acceptance of the call, or responds back over the network to say that it is refusing the call, or simply does not respond (times out).

When the coupling is successful the call processing control 208 provides a message labeled 4 from Table 7. The automatic call-work director 210 posts to the Call Station Master Table and the Cluster Master Table 408. The call station's record is posted with the call identifier, the busy-with-call indicator is changed to TRUE, and the current time is posted in the time of receipt of the call. If the application-oriented call processing control 208 does not relate the call station identifier to the connection identifier for the link to the call station then this connection identifier is also placed in the call station records. It is then used by the completion time posting small procedure, running separately, to post the completion of each link in multilink calls.

In the Cluster Master Table the calls received in the call-period is increased by one and the number of active calls is increased by one. In this call is for the initial interruption these and other entries are posted to the Cluster Master Table as described earlier in conjunction with blocks 407 and 408.

If the call was not taken by the chosen call station then the "noResponse" field in the call station's record is marked TRUE and a time is entered in another field in the call station record specifying when next an attempt can be made to assign a call to the call station. This time should be several minutes from the current time. If the call was not taken then the call station selection process is repeated 405 but the above described "no response" entries in the non-responding call station's record will prevent the call station so marked from being again selected. This process continues until a call station takes the call or there is a "no response" from all of the call stations in the cluster.

INTERRUPTION BENEFIT ALGORITHM

Figure 8:
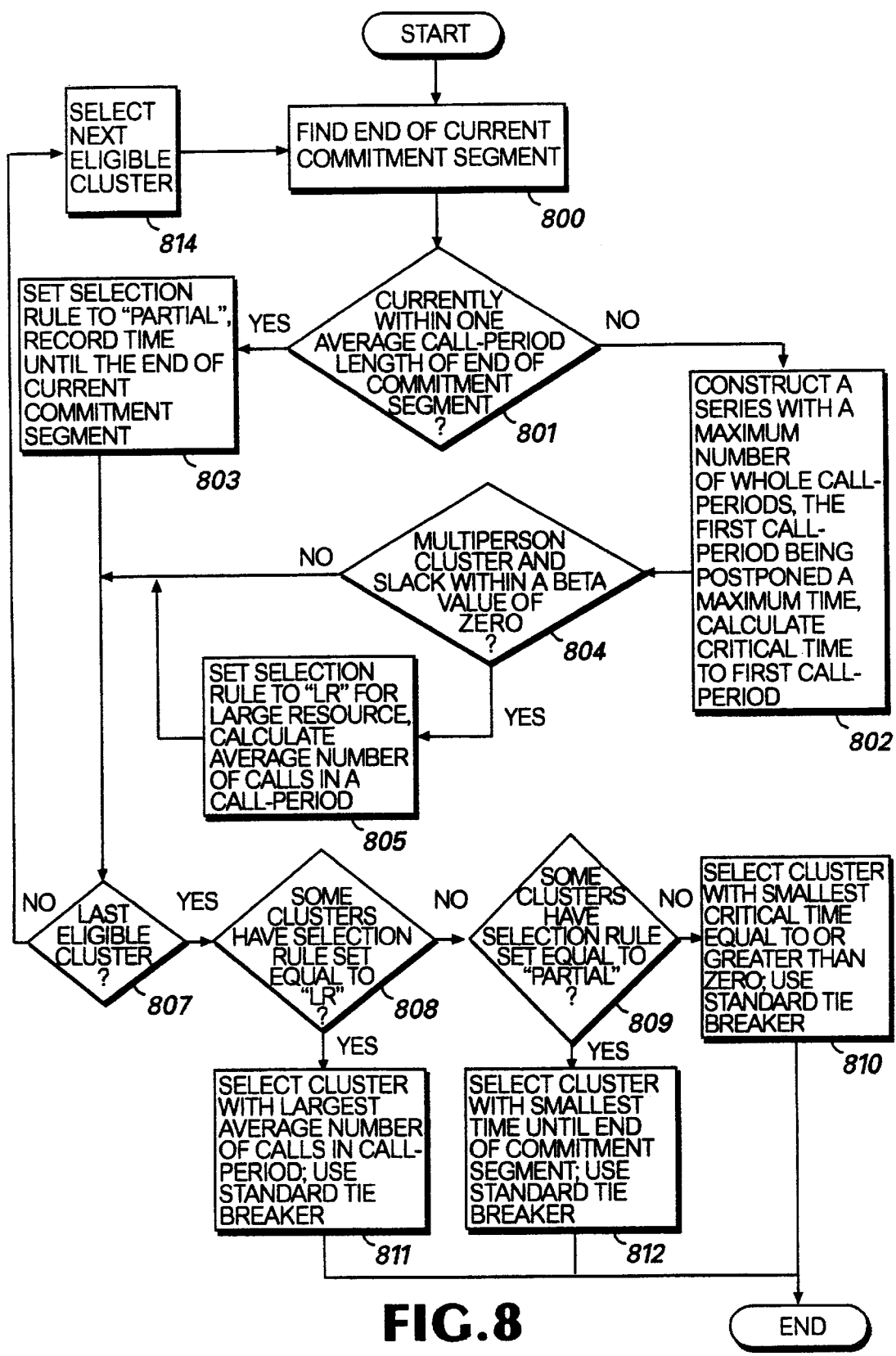
FIG. 8 illustrates the steps within the Interruption Benefit Algorithm used to select one of the clusters eligible to be interrupted.
Figure 9A:
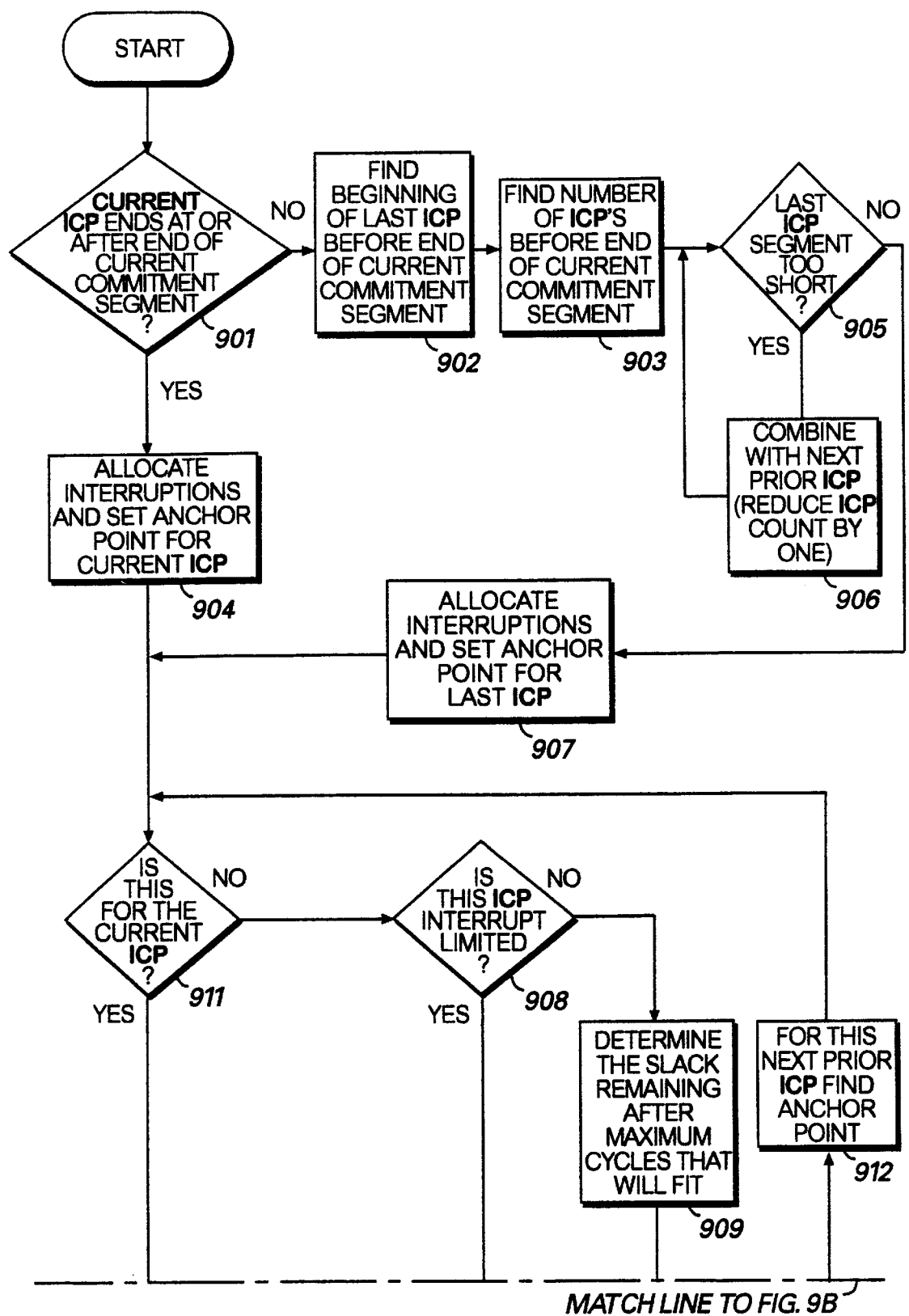
FIG. 9 describes the steps for modeling a series with a maximum number of whole call-periods and finding the critical time until the very next whole call-period.
Figure 9B:
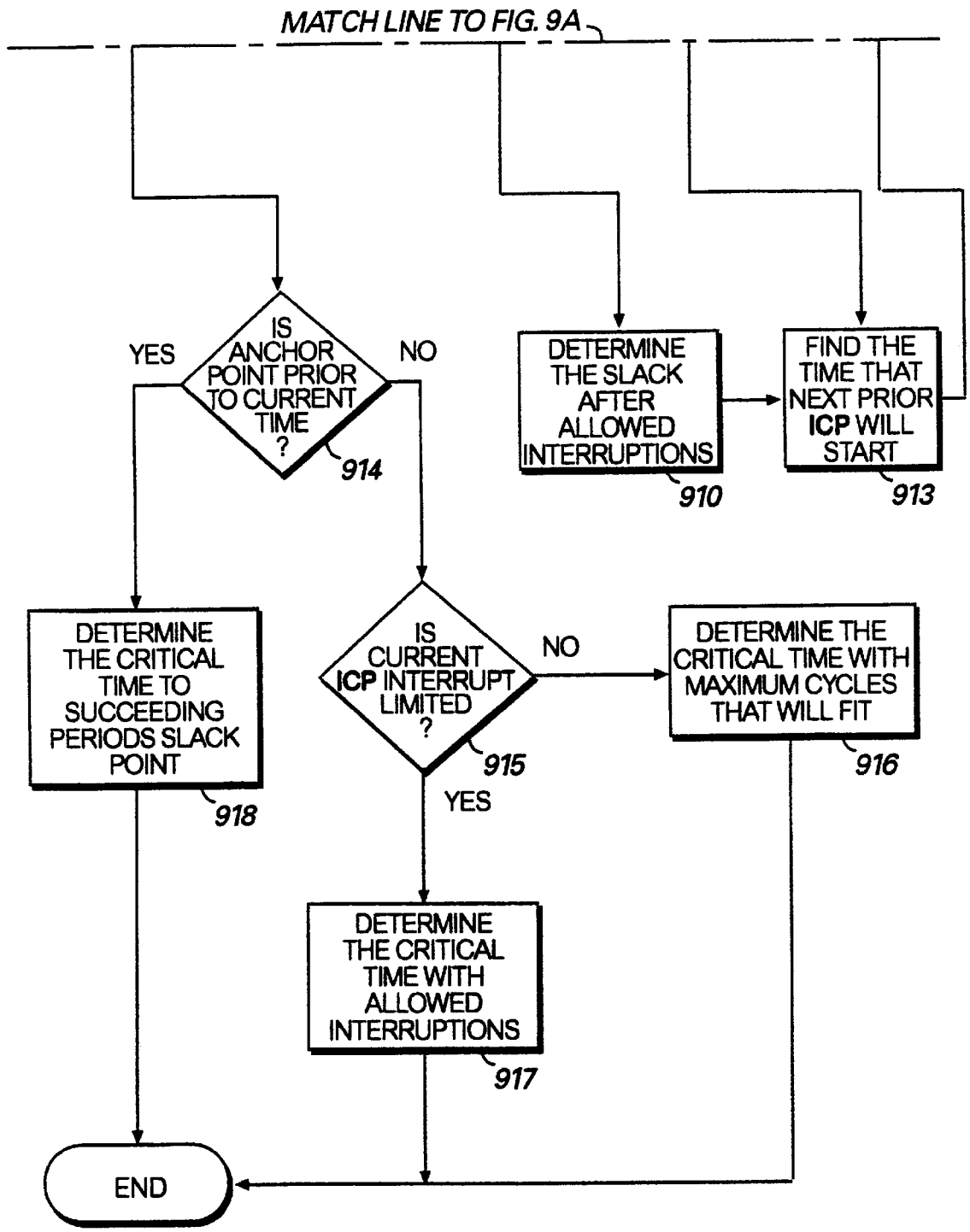
Figure 10:
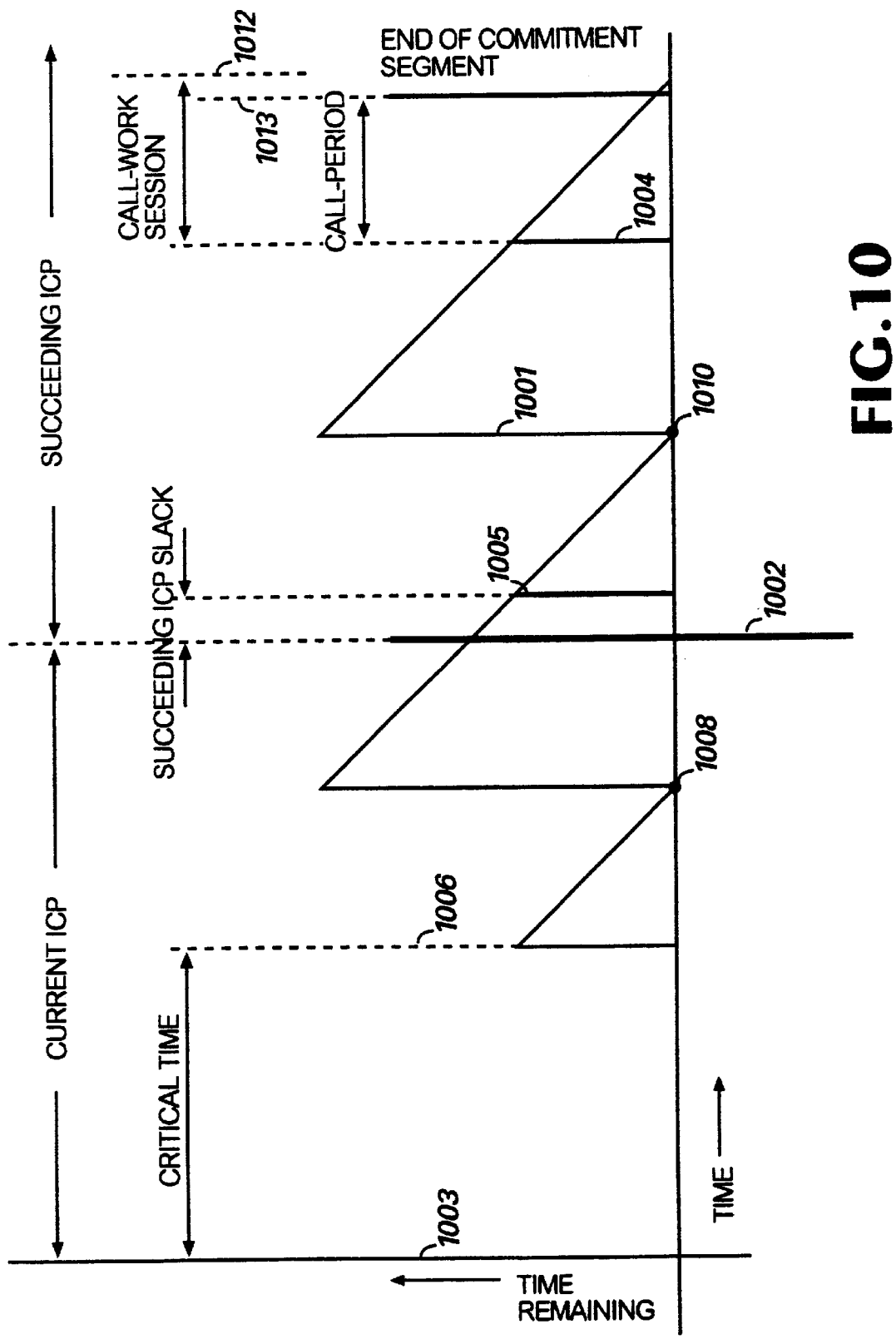
FIG. 10 illustrates features of the call-period and call-work sessions model series as they relate to calculating critical time when multiple interruption counting periods (ICPs) occur before the end of a commitment segment.

The cluster selection procedure employs the Interruption Benefit Algorithm to select from among clusters that have the same predetermined lowest (lowest number is first choice) interruption order number of any clusters eligible to be interrupted. The working of the Algorithm is illustrated in FIGS. 8, 9, and 10. The Interruption Benefit Algorithm endeavors to provide as much flexibility to interrupt the clusters that are eligible to be interrupted as the individual terms allow. It does this by postponing the interruption of any such cluster when some of the resources of another eligible cluster will be lost in a shorter time (or if in special situations, described in conjunction with blocks 800 and 804, the other cluster is a better choice). To measure the time until some of each cluster's call-handling resources will be lost, the Algorithm calculates the critical time as described below. The critical time has the advantage of providing a common measurement of the effects of disparate terms.

Consider now an example of the calculation of the critical time, which is the maximum time for deferring the beginning of the very next call-period in a model series of call-periods. The model series is illustrated in FIG. 10. The critical time is a calculated value. The first step in the calculation is to set up this model series of a call period and whole call-work sessions. An expected call-period length is placed closest to the end of the commitment segment since that is a term for ending a call-period. Next, average call-work session lengths are packed into the remaining interval as tightly as allowed by the interruption-beginning terms of the subject cluster. The critical time is calculated as the time until the start of the very next call-period in this model series. It is calculated only for eligible clusters—those which have had the terms satisfied for interrupting them and from whose ranks a cluster to be allotted the call will be selected.

As an example imagine two clusters, A and B, which can be interrupted. Suppose the minimum uninterruptible interval goal for both A and B is 60 minutes. Further suppose the expected call-period for A is 20 minutes with the expected call-work session being 25 minutes, and the expected call-period for B is 10 minutes with B's expected call-work session length being 15 minutes. Assume too for both clusters the end of the commitment segment is in 190 minutes and the number of interruptions remaining is so large as not to be a factor.

The critical time for A is calculated by:
1. reducing the interval from the current time until the end of the commitment segment, 190 min., by the length of the last call-period of 20 minutes leaving 170 minutes;
2. finding the remaining time after placing as many more call-periods in the 170 minutes as will fit: subtracting an uninterruptible interval, which must preceed the last call-period, and an expected call-work session length (which together are 85 minutes) leaves 85 minutes; subtracting another uninterruptible interval and expected call-work session leaves 0 minutes, which is the remaining time sought.
3. setting the critical time to 0 minutes, the remaining time found in step 2.

The critical time for B is calculated as follows:
1. taking the interval till lunch, 190 minutes, less the last call-period of 10 minutes leaving 180 minutes;
2. finding the remaining time after placing as many more call-periods in the 180 minutes as will fit: substracting an uninterruptible interval, which must preceed the last call-period, and an expected call-work session length (which together are 75 minutes) leaves 105 minutes; substracting another uninterruptible interval and expected call-work session leaves 30 minutes, which is the remaining time sought. (mathematically the same result is obtained by using the modulo—or remainder—function with 180 minutes and 75 minutes as inputs.)
3. setting the critical time to 30 minutes, the remaining time found in step 2.

In this model situation to get three call-periods in before the end of the commitment segment (two plus the last call-period that starts in 180 minutes), cluster A must be selected and interrupted now, whereas all of B's interruptions can still be arranged even if cluster B is not interrupted for 30 more minutes. The critical time criteria then leads under these assumptions to the selection of Cluster A.

Assume now that a n interruption limit of two is imposed on cluster A: it is "interruption-limited" because the two interruptions remaining to be taken for cluster A in the 190 minutes until the end of the commitment is less than the three that could be fit into this time. Segment B continues not to be "interruption-limited." The critical time for cluster A as recalculated is the time remaining until the start of the first of the two call-periods, postponed a maximum amount of time. This is found by backing up to the second call-period from the end of A's commitment segment: subtracting from 190 minutes until the end of the commitment segment first 20 minutes for the call-period nearest the end of the commitment segment, then 60 minutes for the uninterruptible interval associated with this last call-period and then 25 minutes for the average call-work session length of the other allowed interruption which leaves the new critical time of 85 minutes. With this change in assumptions cluster B would be selected since its 30 minutes of critical time is shorter.

The Interruption Benefit Algorithm uses the critical time determination and rules for special situations, when they apply, for selecting from among uninterrupted and eligible clusters—while still observing the restrictions that the clusters' terms represent. Compared to a situation where dedicated call-handling forces are always standing by, the terms enforced by the automatic call-work director 210 impose two forms of restrictions:

1. The number of access opportunities is restricted along with the time that the resource can be accessed.
2. Call handling resources must be added in "chunks" to call handling forces. These chunks consist of a call-period for one or more call stations for a number of calls or a fixed period of time.

The critical time addresses the first restriction. It provides a measurement designed to maximize access to call handling assets while observing access restrictions. However, the second type of restriction is dependent upon the special situation of the moment.

Two special situation rules and a standard tie breaker ruleare included in the Interruption Benefit Algorithm.

1. Use the "partial" selection rule when within the expected length of a call-period from the end of the present commitment segment, previously determined in block 800. A partial call-work session represents an opportunity to employ smaller, more tailor-made amounts of the call-handling resources 801, 803.

2. Use the "large resource" selection rule when one or more eligible clusters are larger than the size cluster normally used and have a critical time near enough to zero so that this may represent the last opportunity to avoid losing from the model series the large resource for a whole call-period 804, 805.

In case of a ti e between clusters, the criteria f or breaking the tie is the number of interruptions remaining per hour of interruption-counting-period remaining. This is the standard tie breaker selection rule. A tie represents a chance to conserve future interruptions and also to square up the number of interruptions imposed upon the tying clusters. This rule looks at differences in the number of call work sessions remaining by calculating the ratio of interruptions remaining to time remaining in the ICP and choosing the cluster with the highest ratio. Should there also be a tie in this measurement then a random selection is made from among the tying clusters.

The expected call-period length and the expected call-work session length are used in setting up the model series. These can be measured directly or calculated using statistics common in the operation of telephone service centers. Only the intervals after the start of the call-period should be gathered. For instance, the average time between the arrival of telephone calls, called the interarrival time, is measured from the first call to the second call, and from the second call to the third, and so forth. The time to the first call in a call-period is ignored. An estimate of the call-period length that works fairly well can be found by first taking the maximum call goal less one for the first call and times the interarrival time as determined above and then comparing this result to the maximum call-period duration goal. The average call period goal will be the lesser of the two. The call-work session can be similarly estimated by taking the lesser of the average call-period plus an average holding time for a call or the maximum call-period duration plus an average extension of the call-period to reach the end of the call-work session. This last element is a new measurement of the average difference between the ending times of the call-period and the ending times of the call-work session. The average holding time represents an upper limit, and it will often be less: about 60% of the average holding time is a reasonable approximation for many single call-station clusters.

With this overview and with the help of FIGS. 8, 9, and 10 the detail working of the Interruption Benefit Algorithm will be described. Looking at FIG. 8 the next end of a clusters present commitment segment 800 is found from the record of the cluster in the Cluster Master Table by just comparing the current time to the beginning and ending times in the schedule of commitment times. The test in block 801 determines if the cluster is within one expected call-period length of the end of the commitment segment (i.e., the sum of the current time and an expected call-period length is a time after the end of the present commitment segment) and if so the special "partial" selection rule applies and in block 803 the time until the end of the commitment segment is found. Also, a variable associated with the cluster representing the selection rule to use is set equal to "partial" indicating the selection rule considering the size of the call-period remaining until the end of the commitment segment is to be applied 805. No further processing is necessary until all of the remaining eligible clusters have been reviewed 807, 814.

If the current time is not within one expected call-period length of the end of the commitment segment then the critical time in the current interruption counting period is calculated 802. FIG. 9 and FIG. 10 described below provide the detail steps for this calculation. If this is a multi-person cluster for which a value has been set for the beta variable the critical time is compared to the beta value 804. If it is less than beta then in block 805 a variable associated with the cluster representing the selection rule to use is set equal to "LR" indicating that in block 808 the selection rule considering the size of the resource is to be applied. For such clusters the number of calls that the cluster can be expected to handle in a call-work session is used to distinguish between them and this is also calculated in block 805 by adding one (for the initial call) to the result of dividing the expected call-period length by the average call interarrival time during a call-period experienced by the cluster.

Beta as used in block 804 must be set for each multi-person cluster which is to be treated as a large resource. Leaving beta as zero will exclude the cluster from being subject to treatment as a large resource. The value of beta may be set by considering the normal time interval that should elapse before the cluster will again be considered for an interruption. The average time between the arrival of calls is a starting point for setting beta. Larger values of beta may be justified if it is important to mitigate the risk of loosing access to a call-period of the large resource. In this case beta may be made larger by setting it equal to the sum of some multiple of the standard deviations of the call interarrival time distribution plus the average of this distribution. Alternatively, if most calls do not result in interruptions then the interarrival times for an appropriate average number of intervening calls for the time interval of most interest may be added together to get beta.

Once the last eligible cluster has been processed by the algorithm 807 then it tests for the two special situations 808, 809. Because the value associated with running out of a resource is usually judged to be higher than the productivity increase obtainable from being able to use partial call-periods, precedence is given herein to the large resource special case 808 and this special case is considered first. If there is more than one large resource cluster then the cluster with the largest number of calls in an average call-period is chosen 811. If there is a tie among the clusters when this selection criteria is applied then it may be broken by applying the standard tie breaker presented above—selecting the cluster which has the most remaining interruptions per hour of ICP left or, if there is a tie in that tie-breaker criteria, by a random choice from among those tying this second time. Should there be no cluster designated a large resource then the selection is from among the clusters, if any, designated "partial"—those now within an expected call-period length of the end of their commitment segment 809. If there is more than one of these, the one with the smallest time until reaching the end of its commitment value is selected 812. Again a tie in this selection criteria may be broken by application of the standard tie breaker.

Unusual circumstances might warrant reversing the order of considering and selecting a cluster for these two special cases involving the partial call-periods and the large resource. For instance, if some blocking of calls were acceptable and cost considerations predominated or several large resources were usually eligible so that their value as relatively rare call handling resources was diminished, then a decision to favor the use of partial periods before making a commitment to a large resource might be made and the blocks 808 and 809 reversed.

If none of the special situations 808, 809 apply, the cluster with the smallest critical time is selected 810. Again the use of the standard tie breaker settles ties between the tying clusters.

The selection of a cluster ends the Interruption Benefit Algorithm.

Additional detail will now be presented on the steps occurring as part of block 802 with the help of FIGS. 9 and 10. First the general approach will be described for finding the critical time for a cluster by constructing a series of call-periods starting at the end of the commitment segment and proceeding backwards to the current time. Then detail steps will be described in conjunction with FIG. 9.

Consider first the example of FIG. 10 which shows graphically the model series for a single cluster. The series was constructed assuming a maximum interruption goal of two interruptions per ICP. With this interruption per ICP goal neither ICP shown in FIG. 10 is "interruption-limited"—all the call periods that will fit are allowed. The dark vertical line 1002 is the start of an ICP that extends past the end of the commitment segment at line 1013. The triangles in FIG. 10 represent minimum expected cycles consisting of an uninterruptible interval goal and an average call-work session length. The height of the sloping line above the abscissa is the time remaining until the end of the call-work session. (A cycle can also be viewed as being formed by the rearranged parts of the triangle: for instance the first small triangle to the left of point 1010 and the polygon to the right of 1010 also make up a cycle.) Consider the right-most triangle: the interval between the two vertical lines 1001 and 1004 is the uninterruptible interval, and the area to the right of the right hand vertical line 1004 prior to the end of the commitment segment 1013 represents the call-period closest to the end of the commitment segment. The end of the call-work session is at line 1012, when the last active call completes.

For the Succeeding ICP the anchor point (defined as the start of the last possible call-period in an ICP which is also in the present commitment segment) is one expected call-period length to the left of the end of the commitment segment line 1013, which is at line 1004. The slack point, defined as the start point of the first call-period in an ICP, is found by moving to the left from the anchor point an integer number of cycle lengths. For the Succeeding ICP this turns out to be one cycle length and is reached in two steps. First by going back the uninterruptible interval length to point 1010, and then by moving back an expected call-work session length to the line labeled 1005. The slack in the Succeeding ICP is the distance between the line 1002 and the line 1005, which marks the slack point. From the slack point 1005 the anchor point for the Current ICP can be found by moving a cycle length to the left in two steps: an uninterruptible interval goal length to the left to point 1008 and then an expected call-work session length to the left of this point to point 1006. In the illustrated case there is not sufficient room to place even one whole cycle to the left of line 1006 so in this case the anchor point is also the slack point. The critical time is the maximum time until the very next call-period in the series which is the time interval between lines 1003 (which represents the present time when a call has arrived) and 1006.

Consider now the change that occurs when only one interruption is allowed and the Succeeding ICP becomes "interruption-limited" since it is constrained by the interruption goal to one interruption rather than the two that would fit into the interval. In the Succeeding ICP only the call-period starting at line 1004 is allowed. This line is over both the anchor point and the slack point and the slack for the Succeeding ICP is the interval from line 1002 to line 1004.

The anchor point for the Current ICP is the last point where a call-period can start in the ICP. Since the slack for the Succeeding ICP is large relatively to the length of an expected call-work session this last call-period could start at the very end of the Current ICP at line 1002. Since only one interruption is allowed this last call-period is also the first call-period and the critical time in the Current ICP in the interruption-limited case is the time remaining from the current time, line 1003, until line 1002.

Consider one final example. Line 1003 represents the current time. As time passes this line can be visualized as moving to the right in FIG. 10. Looking at the series beginning at line 1006, as line 1003 approaches line 1006 the critical time approaches zero. Consider what happens when line 1003 passes the start of the call period in the Current ICP represented by line 1006: the opportunity for this whole call-period passes, and the next opportunity is for the call-period in the Succeeding ICP, beginning at line 1005. The new critical time once line 1003 passes line 1006 will be the time between line 1003 and line 1005. Notice that there will be in this case of the model series no call-periods in the Current ICP.

The Interruption Benefit Algorithm uses the same methods as described above to find the critical time for clusters being considered to be selected for a received call. FIG. 9 illustrates these. Basically, the Interruption Benefit Algorithm will find the critical time in the current ICP by starting at the last ICP before the coming end of the commitment segment and stepping through all of the intervening ICPs finding in turn the anchor point and slack point for the last and all intervening ICPs until it reaches the current ICP. It will use the slack point in the next succeeding ICP to find the anchor point and critical time for the current ICP.

Returning to FIG. 9, the simplest case occurs when the current ICP—the ICP including the current time—ends at or after the end of the present commitment segment —the commitment segment that encompasses the current time. For this simplest case the test at block 901 will return "yes" and the interruptions remaining will be allocated at block 904 between the present commitment segment and the following commitment segment, if any. If there is not a following commitment segment then the number for the remaining interruptions is allocated to the present commitment segment. If there is a following commitment segment, since the goal is to find the time until the first call-period of a series which places the maximum permitted call-periods into the commitment segment, then as many of the remaining interruptions as will fit into the present commitment segment and are allowed are allocated to it. Were there no limit on the interruptions remaining within the current ICP this maximum number that will fit in can be estimated as equal to one plus the integer portion of the quotient obtained by dividing the time interval from the current time until the end of the present commitment segment reduced by the expected length of a call-period by the sum of the length of the uninterruptible interval goal and the length of an average call-work session. This calculated estimated number is then compared to the limit on the remaining and the lower number is used for the allowed remaining interruptions in the segment of the current ICP that is within the present commitment segment.

The anchor point is by definition the beginning of the very last call-period beginning in the subject interruption counting period prior to the end of a commitment segment. When the current ICP extends beyond the end of the commitment segment as in block 904 the anchor point for it is just the end of the present commitment segment less the expected call-period length. The number of ICP's is set to one in block 904. Moving to the test in 911 it produces a "yes" since this is the current ICP, there being only one. In the test of 914 the anchor point is not prior to the current time or else the test in 801 would have resulted in a "yes" and the block 802 being expanded here would not be executed. For this simplest case the next step is to apply steps 915 and 917 or 916.

As in the discussion of FIG. 10 the number of interruptions remaining in the ICP may control the number of call-periods that can be fit into the interval between the anchor point and the current time. For the current ICP this test is applied in block 915. If the product of the number of allowed remaining interruptions reduced by one times the sum of the length of the uninterruptible interval goal and the expected length of a call-work session is less than the interval between the anchor point and the current time then the remaining interval of the current ICP is interruption limited, otherwise it is not. When the interval is interruption limited the critical time in the current ICP is calculated in block 917 by subtracting from the interval length between the anchor point and the current time the product of the number of allowed remaining interruptions, reduced by one, times the sum of the length of the uninterruptible interval goal and the expected length of a call-work session. When the interval is not interruption limited the critical time in the current ICP is calculated in block 916 by setting it equal to the remainder when dividing the interval length between the anchor point and the current time by the sum of the length of the uninterruptible interval goal and the expected length of a call-work session. (When the modulo function is used to find this remainder and when the current time is closer to the anchor point that a single cycle then the value of the remainder is given by the modulo function as the time until the anchor point, which is the correct value for the critical time in this case.) Finishing the critical time calculation ends block 802 for the single ICP that extends to or beyond the end of the present commitment segment.

Consider now the more complex implementation for block 802, when the test in block 901 results in a "no" and there are one or more ICPs after the current ICP before the end of the present commitment segment. The length parameter for all ICPs is the same; however, the segment of the ICP before the end of the commitment segment—the last ICP—may be shorter since the end of the commitment segments need not be considered in setting up ICPs. Also the interval remaining in the current ICP will be shorter since it begins at the present time not the beginning of the ICP. ICP segments of three different lengths are to be expected and will be referred to as the current ICP, intervening ICPs, and the last ICP.

The procedure followed in finding the critical time in the current ICP in this more complex case is to define the last ICP before the end of the commitment segment by finding its starting time; finding the slack time in the last ICP; defining intervening ICPs by finding the time that they start, which is just a multiple of the length of an ICP back from the start of the last ICP, and successively finding the anchor points and slack points in them; using the slack point of the next ICP after the current ICP to define the anchor point for the current ICP from which using the procedures detailed below the critical time in the current ICP can be found.

FIG. 10 illustrated the principals used in this procedure. The steps for the complex case of multiple ICPs in the present commitment segment are now further described in connection with FIG. 9. The start of the last ICP found in block 902 is a distance back from the end of the commitment segment equal to the remainder, if not zero, from dividing the distance in time from the start of the very first ICP in the day to the end of the present commitment segment by the length specified for an ICP. If this remainder is zero then the start of the last ICP is an ICP length back from the end of the commitment segment. The number of ICPs 903 remaining in the present commitment segment including the current ICP is just the result of adding one to the rounded up quotient produced by dividing the interval from the current time to the start of this last ICP segment before the end of the commitment segment by the ICP length. (The rounding up must occur for any fractional part of an ICP, not just when one half or over.)

Once the last ICP starting time and the number of ICPs is found, the interval from the last ICP start time to the end of a commitment segment is compared to one expected call-period length in block 905 in a test to see if it is too short to apply the steps that are to follow. If the length from the last ICP start time to the end of a commitment segment is less than an expected call-period length then at block 906 the last ICP start time is just moved backward by the length of an ICP and a new last ICP start time is calculated. In block 906 the number of ICPs is also reduced by one.

An allocation is made of the interruptions allowed in the last ICP before the end of the commitment segment. The same considerations and method are used as described for the allocation of interruptions in the single ICP case described in block 904 and will not be repeated here. In the special case when a short ICP segment is combined with the prior ICP to form a new last ICP the remaining interruptions referenced in this step is just the goal for the maximum interruptions allowed in an ICP. (If no goal for the maximum call-periods in an ICP was established for a cluster than it may be convenient computationally to substitute an arbitrarily large number for the maximum interruptions allowed.)

The anchor point for the last ICP is found in block 907 by backing up from the end of the present commitment segment by an expected call-period length. Since the test in block 801 insures the current time is prior to this anchor point, determined as described, the anchor point for the last ICP will not be before the current time. Were the consolidation that occurred in 905 to have made this the current ICP then the test at 911 would branch the processing to the test at 914 which would produce a "no" and the critical time would be found as described for the simple case described earlier following a "yes" determination in 901.

Assume then that this is not the current ICP (the count of ICPs is greater than one) and 911 produces a "no" causing a branch to test 908. This block will keep up with the number of the ICP which it is processing which it knows as a result of the calculation in block 903. When processing the last ICP it uses the beginning of the last ICP calculated in block 902 and perhaps recalculated in block 906. If the product of the ICP interruption goal parameter reduced by one times the sum of the length of the uninterruptible interval goal and the expected length of a call-work session is less than the interval between the anchor point and the start of the ICP then the subject ICP is interruption limited and a "yes" results from test 908, otherwise it is not and a "no" results from test 908.

Once the branch to take is determined in block 908 the slack time in the ICP is calculated in either block 909 or 910. When the interval is interruption limited the slack time in the ICP being reviewed is calculated in block 910 by subtracting from the interval length between the anchor point and the ICP start time the product of the number of allowed remaining interruptions reduced by one times the sum of the length of the uninterruptible interval goal and the expected length of a call-work session. When the interval is not interruption limited the slack in the ICP being reviewed is calculated in block 909 by setting it equal to the remainder when dividing the interval length between the anchor point and the ICP start time by the sum of the length of the uninterruptible interval goal and the expected length of a call-work session. (When the modulo function is used to find this remainder and when the ICP start time is closer to the anchor point that a single cycle then the value of the remainder is the time until the anchor point, which is the correct value for the critical time in this case. In any implementation not using this function this result should be provided using program logic.) In both cases 909, 910 the slack point is the point in time an interval equal to the slack after the start of the ICP.

This brings the process to block 913 and to finding the start of the next intervening ICP or the current ICP. For this next prior ICP the time it will start will be found in block 913 by substracting the ICP length parameter from the start of the ICP that succeeds it. (The start time of the last ICP that starts this series was found in block 902.) In block 912 the anchor point is found. Block 907 described how to find the anchor point for the last ICP. For the intervening ICPs and the current ICP the anchor point is found in block 912: for the next prior ICP the anchor point will often be at a trial point calculated by backing up one uninterruptible interval goal before the slack point of the ICP that has just finished being processed, as it was for the Current ICP in the illustrated series of FIG. 10. However, the anchor point must not fall beyond the end of the ICP for which it is sought. So if the time of day represented by that calculated trial point in block 912 comes later in time than the end of the next prior ICP then the anchor point for the next prior ICP will be at the end of this next prior ICP itself rather than at the trial point.

Once the anchor point for the next prior ICP is found the loop is completed back to test 911. The loop continues as described until the anchor point for the current ICP is calculated and the test at 911 produces a "yes."

A special case occurs when this is the anchor point for the current ICP and the point calculated by backing up an uninterruptible interval goal from the succeeding ICP's slack point is prior to the current time. In this special case there will be no interruption in the model series in the current ICP and the next interruption will occur at the slack point in the succeeding ICP. A "yes" from the test in 914 for this special case will lead to the calculation of the critical time in 918 by substracting the current time from the slack point just found for the succeeding ICP to the current ICP in step 910 or 909.

If the test at 914 results in a "no" then the test 915 and the blocks 917 or 916, previously described, result in a critical time being calculated.

I claim:

1. A system for recording, tracking, and enforcing predetermined terms for beginning and ending expected but unscheduled call-periods, during which new calls to the system are received by at least one communications device, thereby restricting the occurrence and extent of such periods, comprising:

(a) means for associating each communications device with a list containing at least one term for beginning and at least one term for ending a call-period;

(b) means for receiving a call to the system;

(c) means for identifying those communications devices that are presently in a call-period and not currently engaged in servicing a call to the system and for which none of the at least one ending term is satisfied;

(d) means, responsive to no communications device being identified by the identifying means, for evaluating the terms for beginning a call-period to determine which of the communications devices not presently in a call-period are allowed to start such a period;

(e) means for selecting from among those communications devices found by the evaluating means to be permitted to start a call-period; and (f) means for coupling the call received by the receiving means to the communications device selected by the selecting means.

2. The system of claim 1 wherein the list associated with the associating means comprises:

(i) a beginning term requiring that the interval of time since the end of the last call-period or if later the end of the last call in existence that started in the last call-period shall be greater than a predetermined length; and (ii) an ending term requiring that the call-period will end when the interval of time that has elapsed since the beginning of the call-period is equal to a predetermined length.

3. The system of claim 1 wherein the list associated with the associating means comprises:

(i) a beginning term requiring that the number of previous call-periods shall be less than a predetermined maximum number established for the current period of counting such periods; and (ii) an ending term requiring that the call-period will end when the interval of time that has elapsed since the beginning of the call-period is equal to a predetermined length.

4. The system of claim 1 wherein the list associated with the associating means comprises:

(i) a beginning term requiring that the number of previous call-periods shall be less than a predetermined maximum number established for the current period of counting such periods; and (ii) an ending term requiring that the call-period will end when the number of calls that have been received is equal to a predetermined goal, which itself may be greater than or equal to one.

5. The system of claim 1 wherein the list associated with the associating means comprises:

(i) a beginning term requiring that the interval of time since the end of the last call-period or if later the end of the last call in existence that started in the last call-period shall be greater than a predetermined length; and (ii) an ending term requiring that the call-period will end when the number of calls that have been received is equal to a predetermined goal, which itself may be greater than or equal to one.

6. The system of claim 1 wherein the list associated with the selecting means is created by:

(i) means for determining for each such communications device the ending point in time of the current commitment to engage in call-periods;

(ii) means for estimating the typical length of a full call-period that does not end due to reaching an ending point in time of a commitment to engage in call-periods;

(iii) means for making a projection for each such communications device of future full call-periods in an interval from the ending point determined in (i) to the current time by proceeding backwards from the ending point and filling this interval starting with a segment which is the typical length of a full call-period as estimated by the estimating means and adding other such segments all separated by segments which are the minimum length permitted by the device's beginning terms; and (iv) means for selecting the communications device which in its projection, made by the making means, looking forward from the present time has the least time remaining before the first segment representing the typical length of a full call-period.

7. A system for recording, tracking, and enforcing predetermined terms for beginning and ending expected but unscheduled call-periods, during which new calls to the system are received by at least one communications device, and wherein such terms restrict the occurrence and extent of the call-periods and also may grant preferential rights to receive incoming calls during such periods, comprising:

(a) means for associating a communications device with a list containing at least one term for beginning and at least one term for ending a call-period, and with a preference indicator which if TRUE grants the communications device a claim to be first to receive an incoming call to the system when in a call-period;

(b) means for receiving a call to the system;

(c) means for identifying those communications devices that are presently in a call-period and not currently engaged in servicing a call and for which none of the at least one ending term is satisfied;

(d) means for selecting from among those communications devices identified by the identifying means by first selecting from among such devices with a preference indicator indicating TRUE; and (e) means for coupling the call received by the receiving means to the communications device selected by the selecting means.

8. A system for recording, tracking and enforcing predetermined terms for beginning and ending expected but unscheduled call-periods, during which new calls to the system are received by at least one communications device, thereby restricting the occurrence and extent of such periods, comprising:

(a) means for associating a communications device with a list containing at least one term for beginning and at least one for ending a call-period;

(b) means for receiving a call to the system;

(c) means for identifying those communications devices that are presently in a call-period and not currently engaged in servicing a call and for which none of the at least one ending term is satisfied;

(d) means, responsive to no communications device being identified by the identifying means, for assigning a priority to the received call reflecting the call's urgency;

(e) means, responsive to no communications device being identified by the identifying means, for modifying the beginning terms in a predetermined way based on the priority of the received call so that as the priority of the received call indicates a higher urgency the restrictions to beginning a call-period imposed by the beginning terms are reduced;

(f) means, responsive to no communications device being identified by the identifying means, for evaluating the beginning terms after they are modified by the modifying means to determine which of the communications devices not presently in a call-period are allowed to start such a period;

(g) means for selecting from among those communications devices found by the evaluating means to be permitted to start a call-period; and (h) means for coupling the call received by the receiving means to the communications device selected by the selecting means.

9. The system of claim 1 wherein the identifying means further comprises:

means for associating a commitment segment with each communications device whereby the commitment segment comprises a time period during which the beginning terms may be evaluated by the evaluating means and wherein the at least one ending term is satisfied immediately after the end of the commitment segment is reached.

10. A process for recording, tracking, and enforcing predetermined terms for beginning and ending expected but unscheduled call-periods, during which new calls are received by at least one communications device, thereby restricting the occurrence and extent of such periods, comprising the steps of:

(a) associating each communications device with a list containing at least one term for beginning and at least one term for ending a call-period;

(b) receiving a call;

(c) identifying those communications devices that are presently in a call-period and not currently engaged in servicing a call and for which none of the at least one ending term is satisfied;

(d) responsive to no communications device being identified in step (c), evaluating the terms for beginning a call-period to determine which of the communications devices not presently in a call-period are allowed to start such a period;

(e) selecting from among those communications devices found by the evaluating means to be permitted to start a call-period; and (f) coupling the received call to the communications device selected in step (e).

11. The process of claim 10 wherein selecting occurs by performing the steps of:

(i) determining for each such communications device the ending point in time of the current commitment to engage in call-periods;

(ii) estimating the typical length of a full call-period that does not end due to reaching an ending point in time of a commitment to engage in call-periods;

(iii) making a projection for each such communications device of future full call-periods in an interval from the ending point determined in step (i) to the current time by proceeding backwards from the ending point and filling this interval starting with a segment which is the typical length of a full call-period as estimated in step (ii) and adding other such segments all separated by segments which are the minimum length permitted by the device's beginning terms; and (iv) selecting the communications device which in its projection, made in step (iii), looking forward from the present time has the least time remaining before the first segment representing the typical length of a full call-period.

12. A process for recording, tracking, and enforcing predetermined terms for beginning and ending expected but unscheduled call-periods, during which new calls are received by at least one communications device, and wherein such terms restrict the occurrence and extent of the call-periods and also may grant preferential rights to receive incoming calls during such periods, comprising the steps of:

(a) associating each communications device with a list containing at least one term for beginning and at least one term for ending a call-period, and with a preference indicator which if TRUE grants the communications device a claim to be first to receive an incoming call to the system when in a call-period;

(b) receiving a call;

(c) identifying those communications devices that are presently in a call-period and not currently engaged in servicing a call and for which none of the ending terms are satisfied;

(d) selecting from among those communications devices identified in step (c) by first selecting from among such devices with a preference indicator indicating TRUE; and (e) coupling the received call to the communications device selected in step (d).

13. A process for recording, tracking, and enforcing predetermined terms for beginning and ending expected but unscheduled call-periods, during which new calls are received by at least one communications device, thereby restricting the occurrence and extent of such periods, comprising the steps of:

(a) associating a communications device with a list containing at least one term for beginning and at least one term for ending a call-period;

(b) receiving a call;

(c) identifying those communications devices that are presently in a call-period and not currently engaged in servicing a call and for which none of the at least one ending term is satisfied;

(d) responsive to no communications device being identified in step (c), assigning a priority to the received call reflecting the call's urgency;

(e) responsive to no communications device being identified in step (c), modifying the beginning terms in a predetermined way based on the priority of the call determined in step (d) so that as the priority of the call indicates a higher urgency the restrictions to beginning a call-period imposed by the beginning terms are reduced;

(f) responsive to no communications device being identified in step (c), evaluating the beginning terms after they are modified by step (e) to determine which of the communications devices not presently in a call-period are allowed to start such a period;

(g) selecting from among those communications devices found in step (f) to be permitted to start a call-period; and (h) coupling the received call to the communications device selected in step (g).

* * * * *

UNITED STATES PATENT AND TRADEMARK OFFICE
CERTIFICATE OF CORRECTION

PATENT NO. : 6,081,592
DATED : June 27, 2000
INVENTOR(S) : Calvin W. Battle

It is certified that error appears in the above-identified patent and that said Letters Patent is hereby corrected as shown below:

<u>Drawings,</u>
Sheet 4, Figure 4, the arrow between blocks 407 and 408 should point from block 407 to 408, its tail touching block 407 and the head of the arrow block 408.

Signed and Sealed this

Twenty-third Day of May, 2006

JON W. DUDAS
*Director of the United States Patent and Trademark Office*